US011218882B2

(12) United States Patent
Moon et al.

(10) Patent No.: US 11,218,882 B2
(45) Date of Patent: Jan. 4, 2022

(54) LBT TECHNIQUE FOR FREQUENCY REUSE IN COMMUNICATION SYSTEM USING UNLICENSED BAND

(71) Applicant: Samsung Electronics Co., Ltd., Gyeonggi-do (KR)

(72) Inventors: Jung-Min Moon, Suwon-si (KR); Seung-Hoon Park, Seoul (KR); Sun-Heui Ryoo, Yongin-si (KR); Byoung-Hoon Jung, Seoul (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,394

(22) PCT Filed: Apr. 8, 2016

(86) PCT No.: PCT/KR2016/003747
§ 371 (c)(1),
(2) Date: Oct. 9, 2017

(87) PCT Pub. No.: WO2016/163831
PCT Pub. Date: Oct. 13, 2016

(65) Prior Publication Data
US 2018/0124611 A1 May 3, 2018

Related U.S. Application Data

(60) Provisional application No. 62/145,072, filed on Apr. 9, 2015, provisional application No. 62/145,197, filed
(Continued)

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/0453* (2013.01); *H04W 74/0808* (2013.01); *H04W 74/0816* (2013.01); *H04L 5/0055* (2013.01)

(58) Field of Classification Search
CPC ............. H04W 16/14; H04W 74/0816; H04W 72/0453; H04W 74/0808; H04L 5/0055
See application file for complete search history.

(56) References Cited

U.S. PATENT DOCUMENTS 8,861,437 B2    10/2014  Stanwood et al.
2015/0071211 A1  3/2015  Seok
(Continued)

FOREIGN PATENT DOCUMENTS

CN    104272847 A    1/2015
WO    2013162339 A1  10/2013
WO    2015034166 A1  3/2015

OTHER PUBLICATIONS

Intel; "LBT Design for LAA Downlink"; 3GPP TSG RAN WG1 Meeting #80; R1-150089; Athens, Greece; Feb. 9-13, 2015; 8 pages.
(Continued)

*Primary Examiner* — Clemence S Han

(57) ABSTRACT

The present invention relates to 5G or pre-5G communication system for supporting a higher data transmission rate after 4G communication system such as LTE. The present invention provides a method for transmitting data on the basis of a measurement of a channel of an unlicensed band in a mobile communication system, the method comprising the procedures of: selecting a random number for backoff counting; determining whether to decrement the random number by 1; decrementing the random number by 1 on the basis of the determining; determining whether the channel is idle by measuring the channel; completing the backoff counting if the random number becomes 0; and transmitting
(Continued)

data by means of the channel if the backoff counting is completed.

14 Claims, 38 Drawing Sheets

Related U.S. Application Data on Apr. 9, 2015, provisional application No. 62/161,594, filed on May 14, 2015, provisional application No. 62/199,392, filed on Jul. 31, 2015.

(51) Int. Cl.
*H04W 74/08* (2009.01)
*H04W 72/04* (2009.01)
*H04L 5/00* (2006.01)

(56) References Cited

U.S. PATENT DOCUMENTS

| | | | | |
|---|---|---|---|---|
| 2015/0373741 | A1* | 12/2015 | Yerramalli | H04W 74/0808 370/336 |
| 2016/0066294 | A1* | 3/2016 | Luo | H04W 56/0045 370/336 |
| 2016/0164638 | A1 | 6/2016 | Seok | |
| 2017/0013469 | A1* | 1/2017 | Larsson | H04W 16/14 |
| 2017/0339704 | A1* | 11/2017 | Matsumoto | H04W 16/14 |
| 2017/0339721 | A1* | 11/2017 | Mukherjee | H04W 74/0816 |
| 2018/0054741 | A1* | 2/2018 | Froberg Olsson | H04W 16/14 |
| 2018/0288801 | A1* | 10/2018 | Cierny | H04L 27/0008 |

OTHER PUBLICATIONS

ZTE; "Frame Structure Design for LAA Considering LBT"; 3GPP TSG RAN WG1 Meeting #80; R1-150154; Athens, Greece; Feb. 9-13, 2015; 7 pages.

Ericsson; "Further Details on LBT for LAA"; 3GPP TSG RAN WG1 Meeting #80: R1-150584; Athens, Greece; Feb. 9-13, 2015; 6 pages.

The First Office Action in connection with Chinese Application No. 201680020952.7 dated Nov. 4, 2020, 14 pages.

* cited by examiner

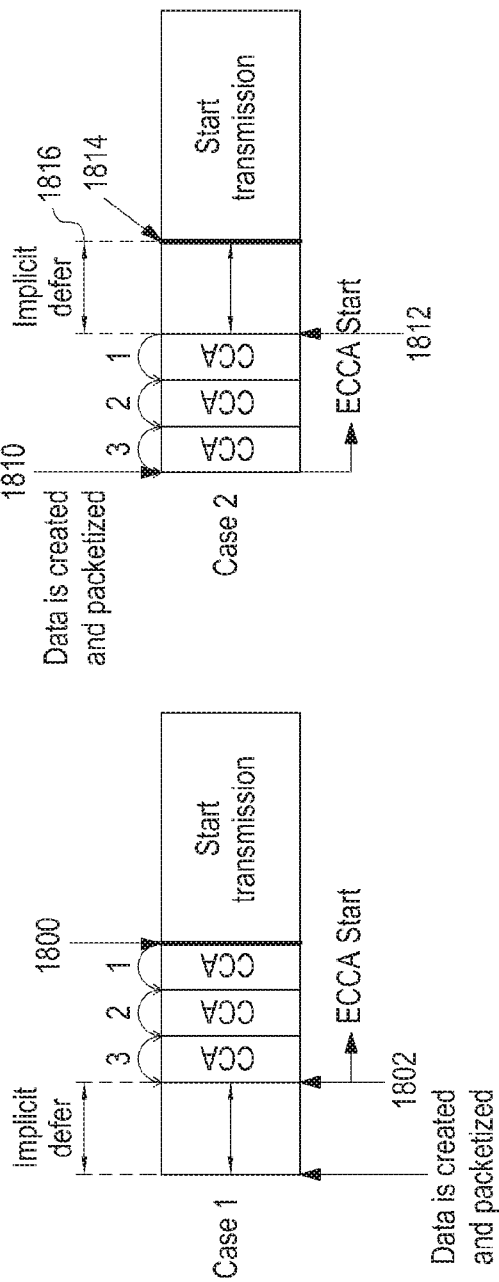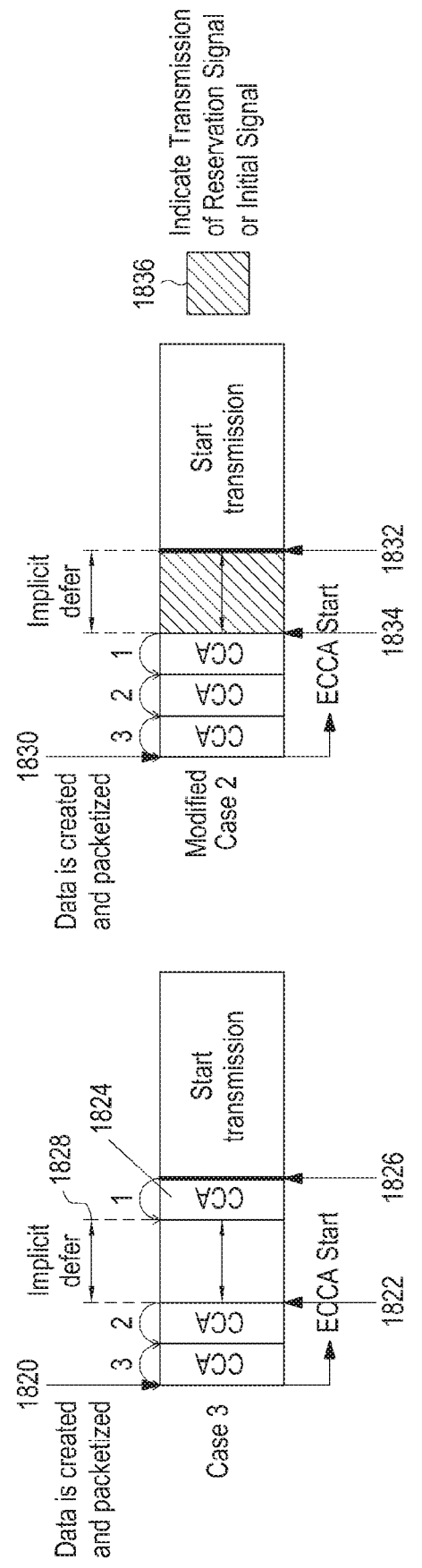
FIG. 18A
FIG. 18B
FIG. 18C
FIG. 18D (a) Proposed LBT (alt. 1)

LBT TECHNIQUE FOR FREQUENCY REUSE IN COMMUNICATION SYSTEM USING UNLICENSED BAND

CROSS-REFERENCE TO RELATED APPLICATIONS AND CLAIM OF PRIORITY

This application is a National Phase Entry of PCT International Application No. PCT/KR2016/003747, which was filed on Apr. 8, 2016, and claims priority to U.S. Patent Application Nos. 62/145,072 filed on Apr. 9, 2015, 62/145,197 filed on Apr. 9, 2015, 62/161,594 filed on May 14, 2015, and 62/199,392 filed on Jul. 31, 2015, the contents each of which are incorporated herein by reference.

TECHNICAL FIELD

The present disclosure relates to a listen before talk (LBT) scheme of a communication system using an unlicensed band, and more particularly, to an LBT operation of a Long Term Evolution (LTE) system.

BACKGROUND

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

An LTE system using an unlicensed band is also referred to as a licensed assisted access (LAA) system. Any communication system (e.g., LTE, Wireless Fidelity (Wi-Fi), etc.) using an unlicensed band, including the LAA system, has to comply with regulations specified for the band.

At present, one of important regulations considered in LAA designing is LBT. According to the regulations (i.e., LBT), a transmitter has to perform clear channel assessment (CCA) before transmitting a signal in an unlicensed band. CCA is an operation of assessing whether a channel to be transmitted by the transmitter is clear. The transmitter measures (senses) a channel for a specific time (e.g., a CCA slot), and if a magnitude of an interference signal measured in the channel is less than a CCA threshold, the transmitter assesses the channel as a 'clear channel'; if the measured magnitude of the interference signal is greater than or equal to the CCA threshold, the transmitter assesses the channel as a 'busy channel'. The transmitter transmits the signal when detecting the clear channel. The transmitter may not transmit the signal when detecting the busy channel. Herein, the transmitter may be a base station or a Wi-Fi access point (AP) for a downlink (DL), and may be a user equipment for an uplink (UL).

In the LTE system based on a cellular environment, the cellular environment is designed by a common carrier to avoid interference between base stations, such that even if two or more base stations simultaneously transmit a signal using the same unlicensed band, a problem caused by interference between the base stations does not occur. Thus, a base station in the LTE system based on the cellular environment achieves a frequency reuse rate of, substantially, 1. However, when an LTE base station desires to transmit a signal in an unlicensed band, CCA has to be performed according to LBT regulations, and thus simultaneous transmission by another base station or Wi-Fi transmitter may be limited. As a result, unlicensed-band transmission of the LAA system may fail to achieve a frequency reuse rate of 1.

Hence, there is a need for a scheme for achieving a frequency reuse rate of 1 of an LAA system using a resource of an unlicensed band.

SUMMARY

The present disclosure proposes an LBT scheme having an advantage of load based equipment (LBE)-based LBT and an advantage of frame based equipment (FBE)-based LBT. That is, the present disclosure proposes an LBT scheme capable of easily achieving a frequency reuse rate of 1 while improving a channel occupancy probability by performing extended CCA (ECCA).

The present invention provides a method for transmitting data based on measurement with respect to a channel of an unlicensed band in a mobile communication system, the method comprising selecting a random number for backoff counting, determining whether to decrement the random number by 1, decrementing the random number by 1 based on the determining, determining whether the channel is idle by measuring the channel, completing the backoff counting if the random number becomes 0, and transmitting data through the channel if the backoff counting is completed.

The present invention also provides an apparatus for transmitting data based on measurement with respect to a channel of an unlicensed band in a mobile communication system, the apparatus comprising a controller configured to select a random number for backoff counting, determine whether to decrement the random number by 1, decrement the random number by 1 based on the determination, determine whether the channel is idle by measuring the channel, and complete the backoff counting if the random number becomes 0, and a transceiver configured to transmit data through the channel if the backoff counting is completed.

Provided is an LBT scheme having both an advantage of LBE-based LBT and an advantage of FBE-based LBT. According to the present disclosure, by performing ECCA, a frequency reuse rate of 1 may be easily achieved, while improving a channel occupancy probability by performing extended CCA (ECCA).

BRIEF DESCRIPTION OF THE DRAWINGS

FIGS. 18A-18D are an exemplary diagram showing a scheme for synchronizing data transmission timings using an implicit defer duration by a base station;

DETAILED DESCRIPTION

Hereinafter, embodiments of the present disclosure are described in detail with reference to the accompanying drawings. In the following description of the present disclosure, a detailed description of well-known functions or elements associated with the present disclosure will be omitted if it unnecessarily obscures the subject matter of the present disclosure. The terms as used herein are defined considering the functions in the present disclosure and may be replaced with other terms according to the intention or practice of the user or operator. Therefore, the definitions should be made based on the contents throughout the entire description of the present disclosure.

Before a detailed description of the present disclosure is made, examples of interpretable meanings will be provided for several terms used herein. However, it should be noted that the meanings of the terms are not limited to the examples provided below.

A base station is an entity that communicates with a user equipment, and may also be referred to as a BS, a NodeB (NB), an eNodeB (eNB), or the like. A Long Term Evolution (LTE) base station in an unlicensed band may be referred to as a licensed assisted access (LAA) eNB, and a Wireless-Fidelity (Wi-Fi) base station in an unlicensed band may be referred to as a Wi-Fi access point (AP).

The user equipment is an entity that communicates with the base station, and may also be referred to as a UE, a mobile station (MS), a mobile equipment (ME), a device, a UE, or the like. A UE in an unlicensed band may be referred to as an LAA UE.

The following description will focus on a case where a transmitter is an eNB or a Wi-Fi AP, assuming a downlink (DL). However, it should be noted that a scheme according to the present disclosure is also applicable to uplink (UL) transmission. When the present disclosure is applied to an UL operation, related parameters and corresponding operations may be determined in a listen before talk (LBT) operation of a UE for a frequency reuse rate of 1.

According to a document specifying LBT (e.g., European Telecommunications Standards Institute (ETSI) EN 301 893 V1.7.1), LBT includes frame based equipment (FBE)-based LBT and load based equipment (LBE)-based LBT.

Figure 1A:
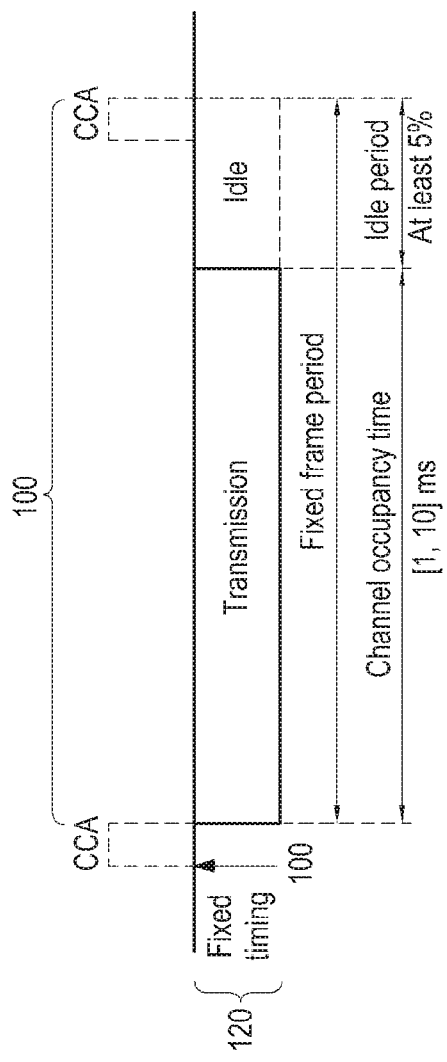
FIGS. 1A and 1B are exemplary diagrams showing an FBE-based LBT operation and an LBE-based LBT operation in an unlicensed band.
Figure 1B:
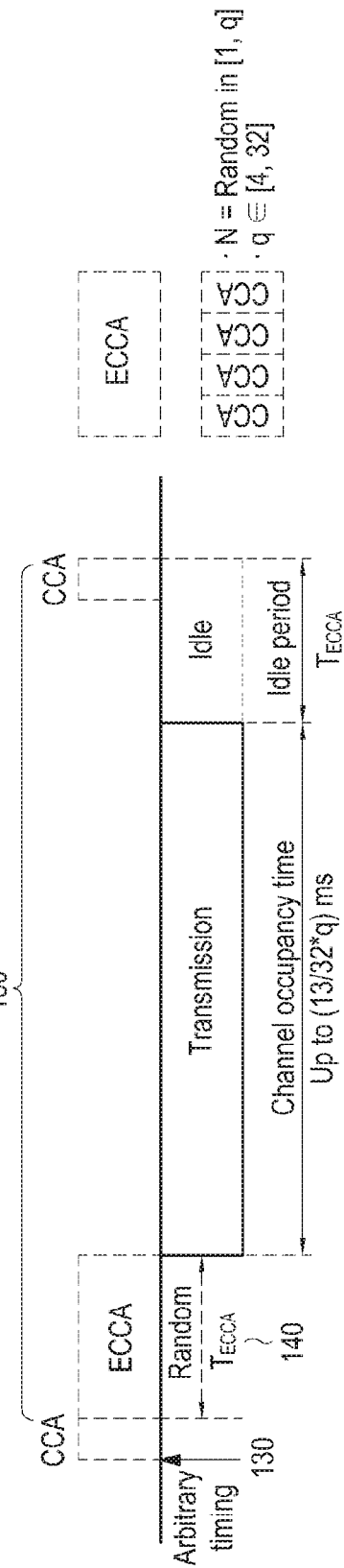

FIG. 1 is an FIGS. 1A and 1B are exemplary diagram showing an FBE-based LBT operation and an LBE-based LBT operation in an unlicensed band.

FIG. 1A illustrates an FBE-based LBT operation. In FBE-based LBT, a clear channel assessment (CCA) execute timing 100 of a transmitter is fixed. That is, the transmitter may execute CCA with respect to a channel only at a fixed CCA execute timing. In a duration 110 from a current CCA end timing to a next CCA end timing (hereinafter, a 'CCA duration'), the transmitter may occupy a channel 120 for 1 ms (millisecond) up to 10 ms, and has to empty the channel 120 during an idle period corresponding to at least 5% of the CCA duration 110.

FIG. 1B illustrates an LBE-based LBT operation. In LBE-based LBT, a CCA execute timing of the transmitter is not fixed, but arbitrary, and the transmitter may execute CCA with respect to a channel at an arbitrary timing 130 or 140 in a CCA duration 150. Unlike in FBE-based LBT in which CCA is performed once during a CCA duration, in LBE-based LBT, CCA executed twice or more during the CCA duration 150, that is, extended CCA (ECCA) is allowed. More specifically, although failing in CCA once, the transmitter may select a random number N for backoff counting and execute additional CCA with respect to the channel, and if detecting a clear channel as many times as the random number for the channel, the transmitter may transmit a signal while occupying the channel for up to (13/32*q) ms. When ECCA is executed, N may be determined between 1 and q, and q indicating a contention window size (CWS) may have a value of, for example, 4 or 32.

Since an LAA system is basically a cellular system despite using an unlicensed band, application of a frequency reuse rate of 1 is favorable to resource utilization as described above.

In light of a frequency reuse rate of 1 and a channel occupancy probability, FBE and LBE may have strong points and weak points.

In this regard, FBE-based LBT will be described first. In FBE-based LBT, a CCA execute timing of a transmitter is fixed. As CCA execute timings of several eNBs are set to coincide with one another, the eNBs may simultaneously transmit signals, thereby easily achieving a frequency reuse rate of 1. However, CCA execution is allowed only once during a fixed frame period defined in FBE, resulting in the low probability of the transmitter occupying a channel. The low probability of the transmitter occupying a channel means a long wait time.

Next, LBE-based LBT will be described. In LBE-based LBT, if a regulation regarding an idle period is satisfied, the transmitter may execute CCA at an arbitrary timing (not a fixed timing), resulting in the high probability of the transmitter occupying a channel. However, a random number selected in ECCA execution may differ with a transmitter (e.g., an eNB), and an ECCA end timing may also differ with a transmitter. Different ECCA end timings of transmitters lead to a failure in simultaneous signal transmission of the transmitters, making it difficult to achieve a frequency reuse rate of 1.

The present disclosure proposes an LBT scheme having an advantage of LBE-based LBT and an advantage of FBE-based LBT. That is, the present disclosure proposes an LBT scheme capable of easily achieving a frequency reuse rate of 1 while improving a channel occupancy probability by performing ECCA.

Hereinafter, a proposed scheme will be described based on a DL operation. However, the proposed scheme may also be applied to an UL operation based on the same principle. The proposed scheme determines a node that is to perform transmission in a distributed manner, and eNBs belonging to the same operator (mobile network operator (MNO)) simultaneously perform transmission, thereby achieving a frequency reuse rate of 1.

Figure 2:
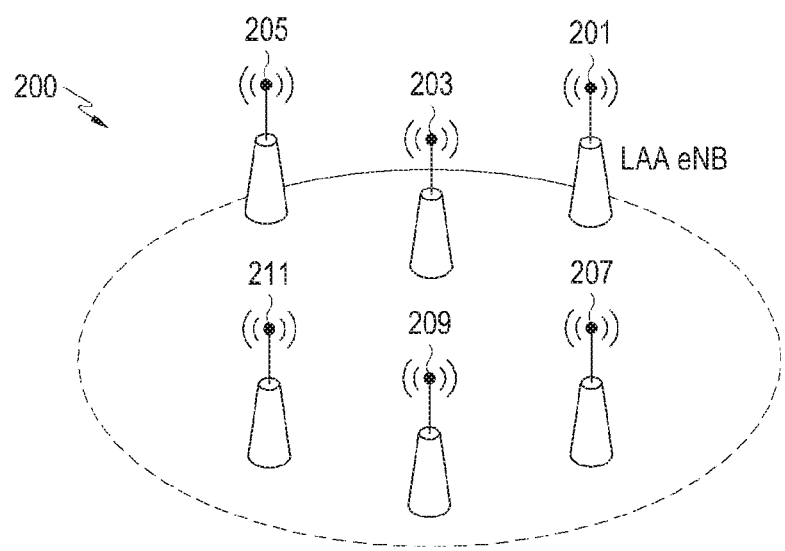
FIG. 2 is an exemplary diagram of a communication system to which a scheme proposed according to the present disclosure is applied.

FIG. 2 is an exemplary diagram of a communication system to which a scheme proposed according to the present disclosure is applied.

The proposed scheme basically uses ECCA. A transmitter (i.e., an eNB) selects a random number in a given range and detects a clear channel as many times as the selected number before transmitting a signal in an unlicensed band, and then transmits the signal. Each eNB in a system 200 may independently select a random number when executing ECCA. eNBs (LAA eNB) 201, 203, 205, 207, 209, and 211 in the system 200 perform ECCA while sharing ECCA end timings. If the eNB (e.g., 201) shares an ECCA end timing, the ECCA end timings may be aligned (or synchronized) even if a random backoff for ECCA is performed, thereby enabling simultaneous transmission of the eNBs. The random backoff means backoff counting using a random number, and the backoff counting means decrementing the random number by 1 every detection of a clear channel through ECCA.

A method for executing CCA by a transmitter according to the present disclosure may include at least one of an operation of sharing a common ECCA end timing between eNBs, an operation of selecting a random number for ECCA, an operation of selecting an ECCA end timing, and an ECCA start timing from a random number, and an operation of performing transmission by multiple eNBs at the same time (e.g., the common ECCA end timing).

Figure 3:
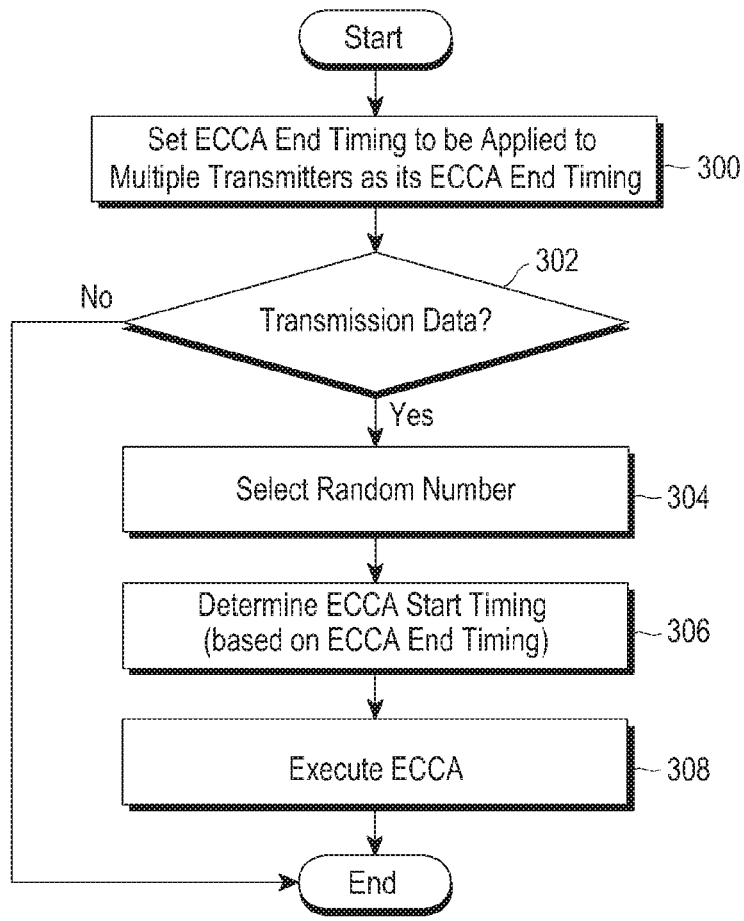
FIG. 3 is a flowchart of a method for executing CCA by a transmitter according to the present disclosure.

FIG. 3 is a flowchart of a method for executing CCA by a transmitter according to the present disclosure.

A transmitter (e.g., an LAA eNB) sets an ECCA end timing shared with another transmitter as its ECCA end timing in operation 300. To this end, the transmitter may further perform an operation of sharing (transmitting or receiving) information about an ECCA end timing with another transmitter.

For example, when the transmitter is an eNB, the eNB may share an ECCA end timing in manners described below.

First, after determining an ECCA end timing, a mobility management entity (MME) delivers information about the determined ECCA end timing to multiple eNBs through an S1 interface or other interfaces.

Second, after one (referred to as a 'representative eNB') of multiple eNBs (or referred to as an 'eNB group') determines an ECCA end timing, the representative eNB delivers information about the determined ECCA end timing to a eNB(s) belonging to the eNB group through an X2 interface (inter-eNB interface), an air interface, or other interfaces, etc.

Third, in a system like a cloud radio access network (C-RAN), a distributed antenna system (DAS), or a virtual cell system where a central unit (CU) and a distributed unit (DU) are separated, the CU determines an ECCA end timing and delivers information about the determined ECCA end timing to multiple DUs (i.e., eNBs) through a CU-DU interface, etc. Herein, a CU may be referred to as other names such as a central office, a virtual base station, etc., and a DU may also be referred to as other names such as a remote radio head (RRH), an access unit (AU), etc.

Fourth, when a scheme according to the present disclosure is applied to an UL, an eNB determines a CCA end timing or an ECCA end timing and delivers information about the end timing to a UE through a physical downlink control channel (PDCCH), a physical uplink shared channel (PUSCH), a radio resource control (RRC) message (e.g., an RRC connection reconfiguration message), system information (e.g., a system information block (SIB)), etc. of a primary cell (PCell) operating in a licensed band. The eNB may also deliver information about the end timing to a UE through a PDCCH, a PUSCH, an RRC message (e.g., an RRC connection reconfiguration message), system information (e.g., an SIB), etc. of a secondary cell (SCell) operating in a licensed band.

As the ECCA end timing, timings described below may be used. For example, a frame boundary of SCell operating in an unlicensed band, a subframe boundary of SCell operating in an unlicensed band, a Kth slot boundary (herein, a 'slot' means two slots forming one subframe in an LTE system) of SCell operating in an unlicensed band, an mth symbol boundary of SCell operating in an unlicensed band, an nth CCA slot boundary (herein, a 'CCA slot' means a duration in which CCA is executed once, for example, having a length of 9 μs or 20 μs) of SCell operating in an unlicensed band, or the like may be used as an ECCA end timing. Selectively, SCell operating in an unlicensed band may be or may not be synchronized with PCell operating in a licensed band. If SCell operating in an unlicensed band and PCell operating in a licensed band are synchronized with each other, the aforementioned SCell-related boundaries may be interpreted as boundaries applied to PCell.

The transmitter determines whether there is transmission data in operation 302; if so, the transmitter executes CCA or ECCA to transmit a signal. That is, when the transmitter desires to transmit a signal in an unlicensed band, the transmitter may execute ECCA to determine whether the transmission is possible.

An example of an ECCA process for transmitting a signal by the transmitter is as described below.

The transmitter selects a random number in a given range in operation 304.

The transmitter determines an ECCA start timing according to a proposed scheme in operation 306. For example, the transmitter may determine the ECCA start timing based on the ECCA end timing set in operation 300.

The transmitter executes ECCA with respect to a channel according to a proposed scheme in operation 308.

If detecting a clear channel as many times as the selected random number by executing ECCA with respect to the channel, the transmitter transmits a signal through the channel of an unlicensed band.

With reference to FIG. 3, a method for executing ECCA has been described based on an environment where multiple eNBs transmit a signal when a transmitter is an eNB. However, the proposed scheme according to the present disclosure may be applied based on the same principle to prevent an LBT failure caused by self-interference among multiple cells or carriers managed in one eNB.

As such, a transmitter(s) may execute ECCA while sharing an ECCA end timing. Operation 306 of FIG. 3 will be described in more detail with reference to FIG. 4.

Figure 4:
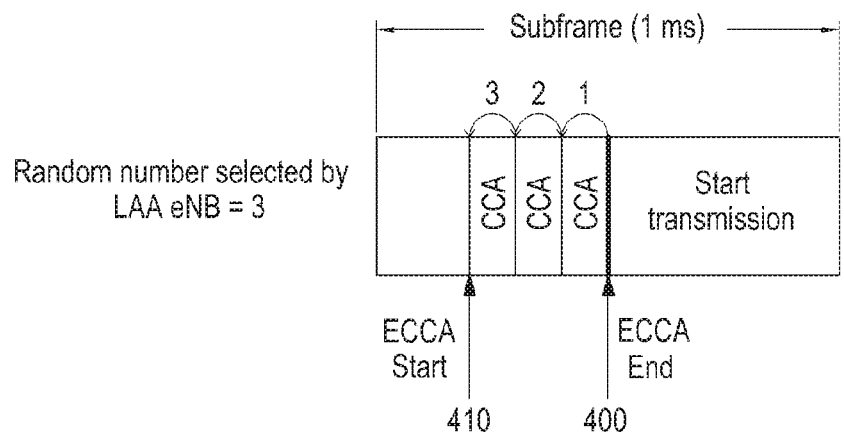
FIG. 4 is an exemplary diagram for determining an ECCA start timing when a random number N selected by a transmitter to perform ECCA is equal to 3 (N=3)

FIG. 4 is an exemplary diagram for determining an ECCA start timing when a random number N selected by a transmitter to perform ECCA is equal to 3 (N=3).

In FIG. 4, an ECCA end timing 400 may be set using information shared between transmitters. An ECCA start timing 410 is set such that if the transmitter detects only a clear channel, ECCA ends at the set ECCA end timing 400. For example, in case of a CCA slot having a length of 20 μs (micro second) and N=3, the ECCA start timing 410 is determined to be a timing preceding the ECCA end timing 400 by 20*3=60 us. If the transmitter starts ECCA with respect to a channel at the determined ECCA start timing 410 and consecutively detects a clear channel as many times as N=3, the transmitter starts transmitting a signal in the channel at the ECCA end timing 400. The signal starting being transmitted by the transmitter (e.g., an eNB) at the ECCA end timing 400 may be an arbitrary signal. For example, the signal starting being transmitted by the transmitter at the ECCA end timing may be an initial signal, a reservation signal, a cell-specific reference signal (CRS), a primary synchronization signal (PSS), a secondary synchronization signal (SSS), a PDCCH, an enhanced physical downlink control channel (ePDCCH), or a PDSCH. A receiver (e.g., a UE) receives the transmitted signal and performs operations such as channel measurement, synchronization, automatic gain control (AGC) setting (setting for determining a signal amplification degree of the UE), a network allocation vector (NAV), etc.

The strong points of the scheme proposed in the present disclosure will be described with reference to FIG. 5.

Figure 5:
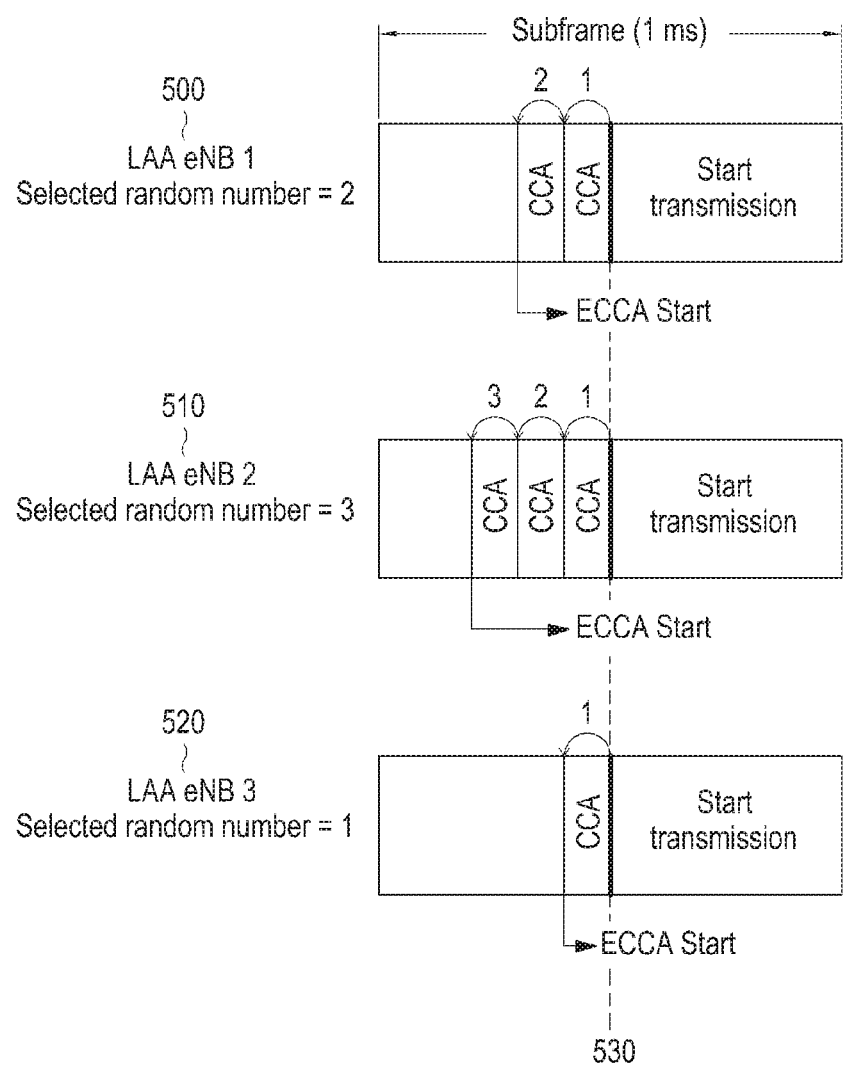
FIG. 5 is an exemplary diagram showing that ECCA end timing coincide with one another for different random numbers selected by a transmitter.

FIG. 5 is an exemplary diagram showing that ECCA end timing coincide with one another for different random numbers selected by a transmitter.

If each transmitter independently selects a random number for executing ECCA and there is no restriction on an ECCA start timing and an ECCA end timing, it may be difficult for multiple transmitters to align ECCA end timings, respectively. Thus, in LBE-based LBT to which the scheme according to the present disclosure is not applied, it is difficult for a transmitter to achieve a frequency reuse rate of 1.

In FIG. 5, LAA eNBs (e.g., LAA eNB1, LAA eNB2, and LAA eNB3) are assumed to be three transmitters and the three eNBs are assumed to exist in a region where carrier sensing with respect to one another is possible. That is, if any one of the three eNBs transmits a signal through a channel, the other two eNBs detect the channel as a busy channel.

For instance, it is assumed that as a random number for executing ECCA, an LAA eNB1 500 selects N1=2, an LAA eNB2 510 selects N2=3, and an LAA eNB3 520 selects N3=1. If the LAA eNB1 500, the LAA eNB2 510, and the LAA eNB3 520 share an ECCA end timing 530 (and consecutively detect a clear channel), each of them sets an ECCA start timing such that its ECCA ends at the shared ECCA end timing 530. Thus, the LAA eNB1 500, the LAA eNB2 510, and the LAA eNB3 520 may end ECCA at the same timing (i.e., 530) even if independently selecting random number for executing ECCA. Thus, the LAA eNB1 500, the LAA eNB2 510, and the LAA eNB3 520 may simultaneously transmit signals through the channel of the unlicensed band. Thus, the frequency reuse rate of 1 of the LAA system may be achieved.

Since FBE-based LBT is designed such that multiple transmitters align CCA execute timings, a frequency reuse rate of 1 is easily achieved, but if CCA fails once, CCA may not be performed again during a given fixed frame period. However, according to the present disclosure, since the transmitter basically executes ECCA, the transmitter may transmit a signal if succeeding in backoff counting as many times as a random number and start ECC at an arbitrary timing. Thus, according to the present disclosure, the transmitter may achieve a frequency reuse rate of 1 while performing LBE-based LBT, and unlike in FBE-based LBT, a wait time until CCA execution after a CCA failure is not required. Thus, the transmitter according to the present disclosure may efficiently use resources.

FIGS. 6A-6D are an exemplary diagram of an ECCA end timing that may be set in common by multiple transmitters in a system.

Figure 6A:
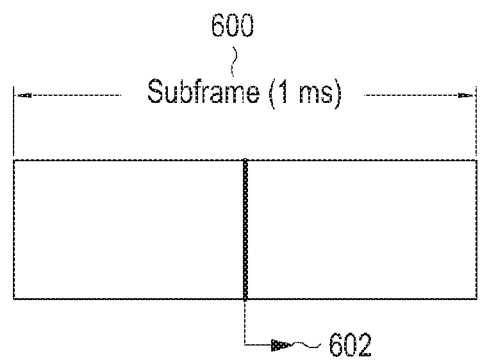
FIGS. 6A-6D are an exemplary diagram of an ECCA end timing that may be set in common by multiple transmitters in a system.
Figure 6B:
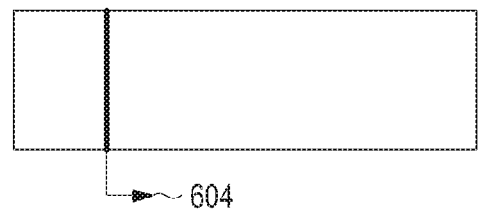
Figure 6C:
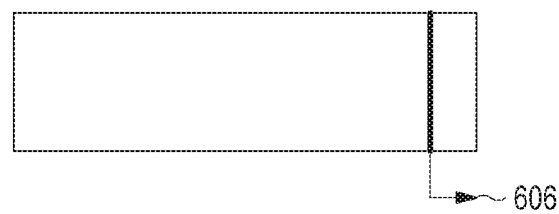
Figure 6D:
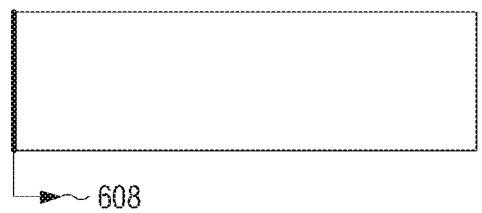

An ECCA end timing may coincide with a kth symbol boundary 602 in a subframe 600 defined in LTE (see FIG. 6A). In another example, an ECCA end timing may be set to arbitrary timings 604 and 606 in the subframe 600 defined in LTE (see FIGS. 6B and 6C). In another example, an ECCA end timing may be set to a boundary 608 of the subframe 600 defined in LTE (see FIG. 6D).

Figure 7:
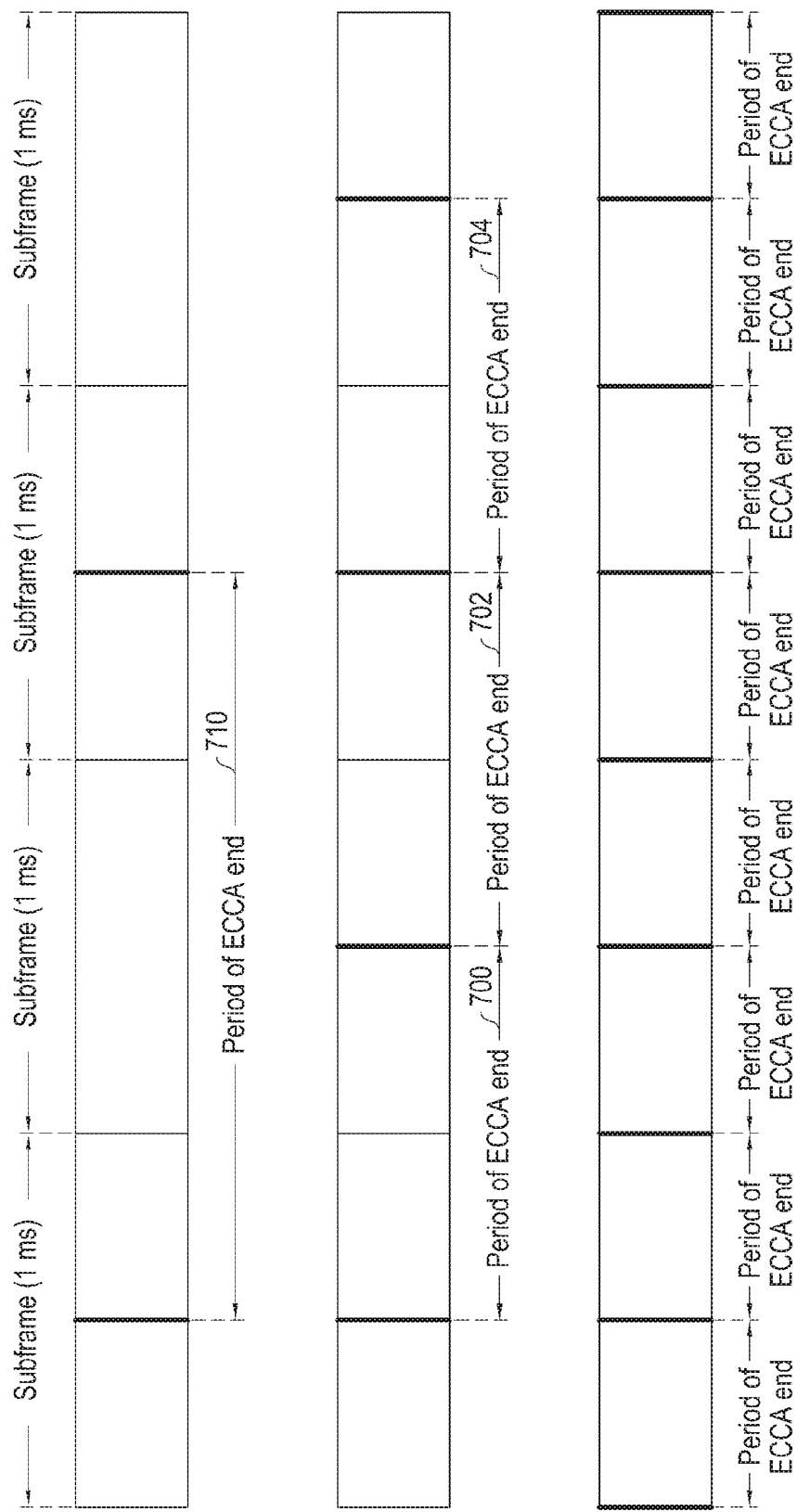
FIG. 7 is an exemplary diagram of a period of an ECCA end timing that is set in common by multiple transmitters in a system.

FIG. 7 is an exemplary diagram of a period of an ECCA end timing that is set in common by multiple transmitters in a system.

A period of an ECC end timing (or ECCA end) may be equal to a length of a subframe defined in LTE, that is, 1 ms (700, 702, 704). In another example, a period of an ECCA end timing may be equal to a multiple of a length of a subframe defined in LTE, that is, (k*1) ms (710). In another example, a period of an ECCA end timing may be equal to a multiple of a length of a slot or symbol defined in LTE (720). In another example, a period of an ECCA end timing may be an arbitrary period.

Figure 8:
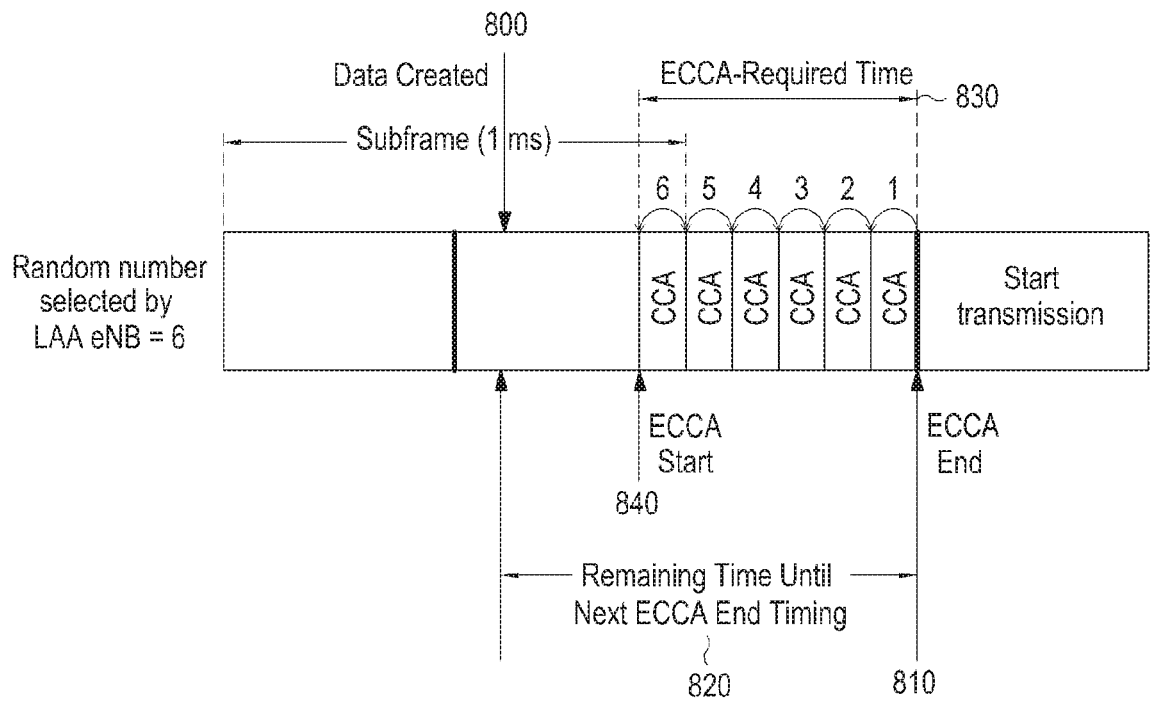
FIG. 8 is an exemplary diagram showing a backoff counting method based on detection of an ECCA start timing and a clear channel when ECCA is executed.

FIG. 8 is an exemplary diagram showing a backoff counting method based on detection of an ECCA start timing and a clear channel when ECCA is executed.

For a description with reference to FIG. 8, an ECCA determination timing 800 at which data to be transmitted by a transmitter is generated or created and whether to execute ECCA is determined, a remaining time 820 until a next ECCA end timing 810 closest to the ECCA determination timing 800, and a time required for ECCA (or ECCA-required time) 830 that is (random number*CCA slot length) μs selected by the transmitter are considered.

If the ECCA-required time 830 is shorter than the remaining time 820 to the closest ECCA end timing 810, an ECCA start timing (i.e., a backoff counting start timing) may be a timing 840 preceding the closest ECCA end timing 810 by the ECCA-required time 830. In practice, the transmitter continuously performs channel measurement for CCA and the backoff counting of the transmitter is performed according to specific conditions. Thus, in the present disclosure, an 'ECCA start timing' may be interpreted as meaning a 'backoff counting start timing'. In this case, the transmitter executes CCA from the ECCA determination timing 800 to the ECCA start timing (i.e., the backoff counting start timing) 840, but determines not to decrement a backoff counter.

Figure 9:
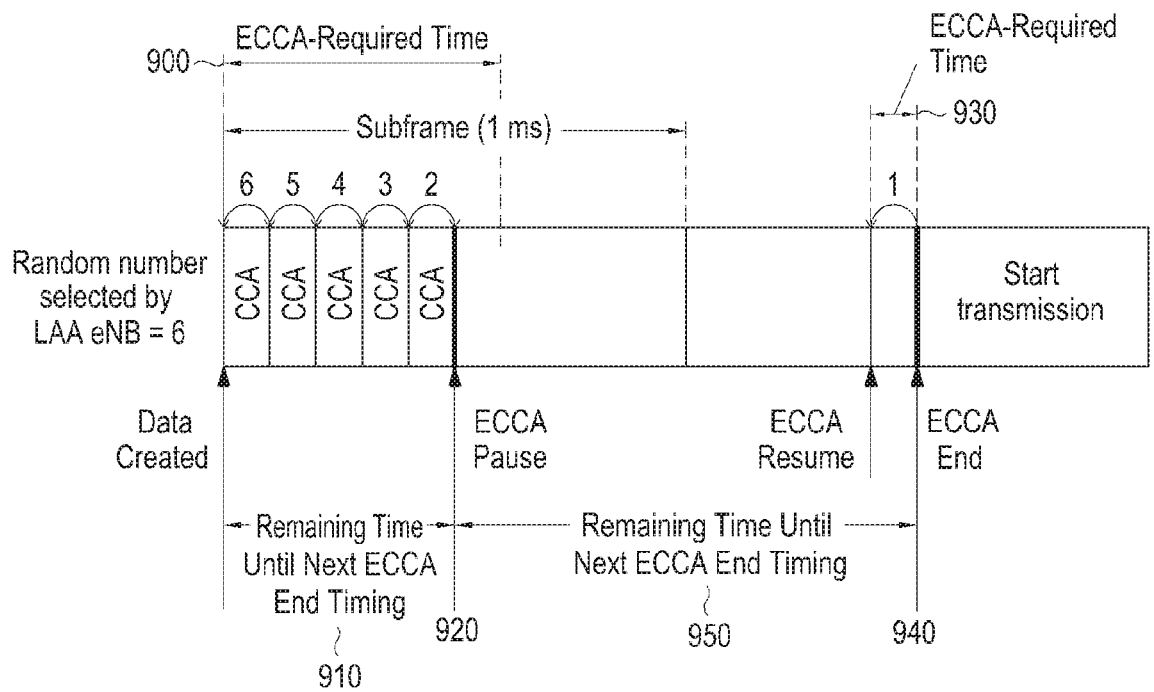
FIG. 9 is another exemplary diagram showing a backoff counting method based on detection of an ECCA start timing and a clear channel when ECCA is executed.

FIG. 9 is another exemplary diagram showing a backoff counting method based on detection of an ECCA start timing and a clear channel when ECCA is executed.

If an ECCA-required time 900 is longer than a remaining time 910 until the closest ECCA end timing 920, the transmitter executes ECCA until the closest ECCA end timing 920. The transmitter than compares a remaining ECCA-required time 930 with a remaining time 950 until a next ECCA end timing 940.

If the remaining ECCA-required time 930 is shorter than the remaining time 950 until the next ECCA end timing 940, the transmitter resumes ECCA at a timing preceding the ECCA end timing 940 by the ECCA-required time 930. On the other hand, if the remaining ECCA-required time 930 is longer than the remaining time 950 until the next ECCA end timing 940, the transmitter continues executing ECCA until the ECCA end timing 940 without stopping executing ECCA.

The transmitter repeats such a process at every ECCA determination timing or ECCA end timing to determine an ECCA execute timing (or resume timing). In practice, the transmitter continuously performs channel measurement for CCA and the backoff counting of the transmitter is performed according to specific conditions. Thus, in the present disclosure, an 'ECCA resume timing' may be interpreted as meaning a 'backoff counting resume timing'.

Figure 10:
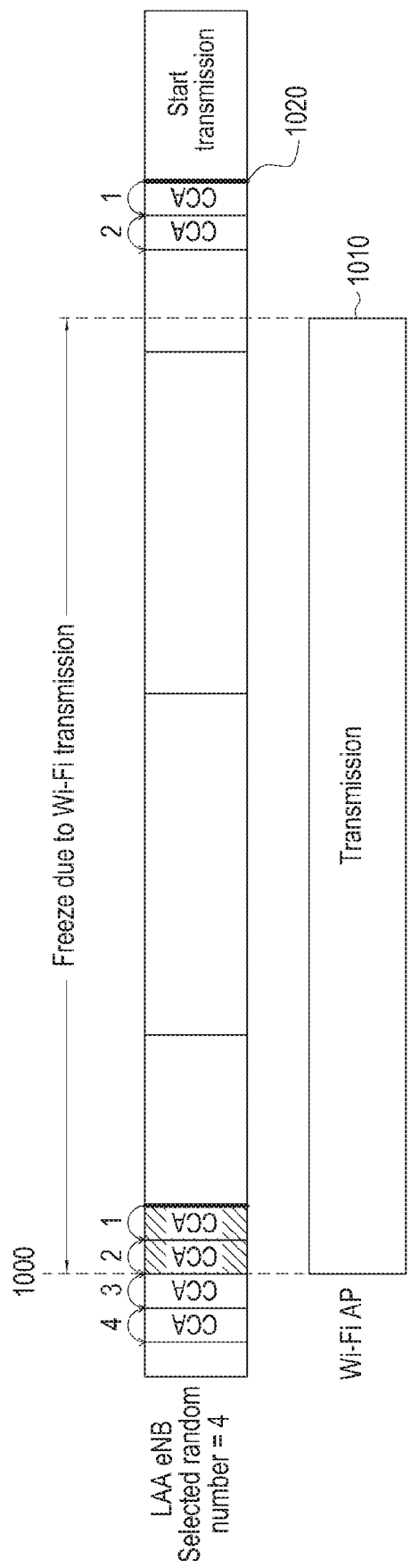
FIG. 10 is an exemplary diagram showing a backoff counting method based on detection of a busy channel when ECCA is executed.

FIG. 10 is an exemplary diagram showing a backoff counting method based on detection of a busy channel when ECCA is executed.

FIG. 10 shows a case where a random number selected by a transmitter for ECCA execution, N, is equal to 4 (N=4). In this case, in order for the transmitter to transmit a signal through a channel of an unlicensed band, a clear channel needs to be detected four times (that is, backoff counting needs to be performed four times). During execution of ECCA, the transmitter determines whether to decrement the random number by 1 (whether to perform backoff counting). If the transmitter, after detecting a clear channel during two times of CCA, detects a busy channel during the third CCA 1000 (for a reason such as start of transmission 1010 of a nearby Wi-Fi AP, etc.), the transmitter determines not to decrement the random number. For example, the transmitter may determine to stop backoff counting until the channel becomes clear in subsequent CCA. If the channel becomes clear (because of stop of transmission by a nearby Wi-Fi AP), the transmitter may determine to decrement the random number by 1. That is, the transmitter resumes backoff counting from a remaining backoff counter Nremaining=2. When the transmitter resumes backoff counting, the transmitter may determine an ECCA resume timing (i.e., a backoff counting resume timing) such that ECCA (i.e., backoff counting) ends at an ECCA end timing 1020 that is set in common by multiple transmitters in a system. Through such operations, the transmitter detects a clear channel as many times as a random number initially selected by the transmitter, N=4, and transmits a signal through a channel of an unlicensed band.

So far, a description has been made of a scheme in which multiple eNBs perform ECCA while sharing an ECCA end timing. Herein, a description will be made of a scheme for improving LBE in which each transmitter starts ECCA at an arbitrary timing, detects a clear channel as many times as an arbitrary selected random number, and transmits a signal.

In LBE to which the scheme according to the present disclosure is not applied, an ECCA end timing differs with a transmitter. Thus, a transmitter passing ECCA first starts transmission through a channel of an unlicensed band and nearby transmitters having detected a busy channel due to transmission by the transmitter passing ECCA pause their backoff counters. In view of a frequency reuse rate of 1, it is not desirable for a transmitter such as an LAA eNB to stop backoff counting due to a nearby LAA eNB. As described above, since LTE is a system designed considering a frequency reuse rate of 1, LTE may smoothly operate without interference when multiple eNBs simultaneously perform transmission. However, it may not be undesirable for the LLA eNB to stop backoff counting due to a transmitter other than an LAA eNB (a Wi-Fi AP, etc.). This is because LAA has to guarantee fairness among other radio access technologies (RATs) using an unlicensed band (e.g., Wi-Fi).

Thus, the present disclosure proposes a scheme in which an LAA eNB occupies a channel by using a signal (i.e., reservation signal) informing other LAA eNBs that it is an LAA eNB. The 'reservation signal' may be referred to as an 'initial signal'. The eNB occupies a channel by using the reservation signal as described below.

Figure 11:
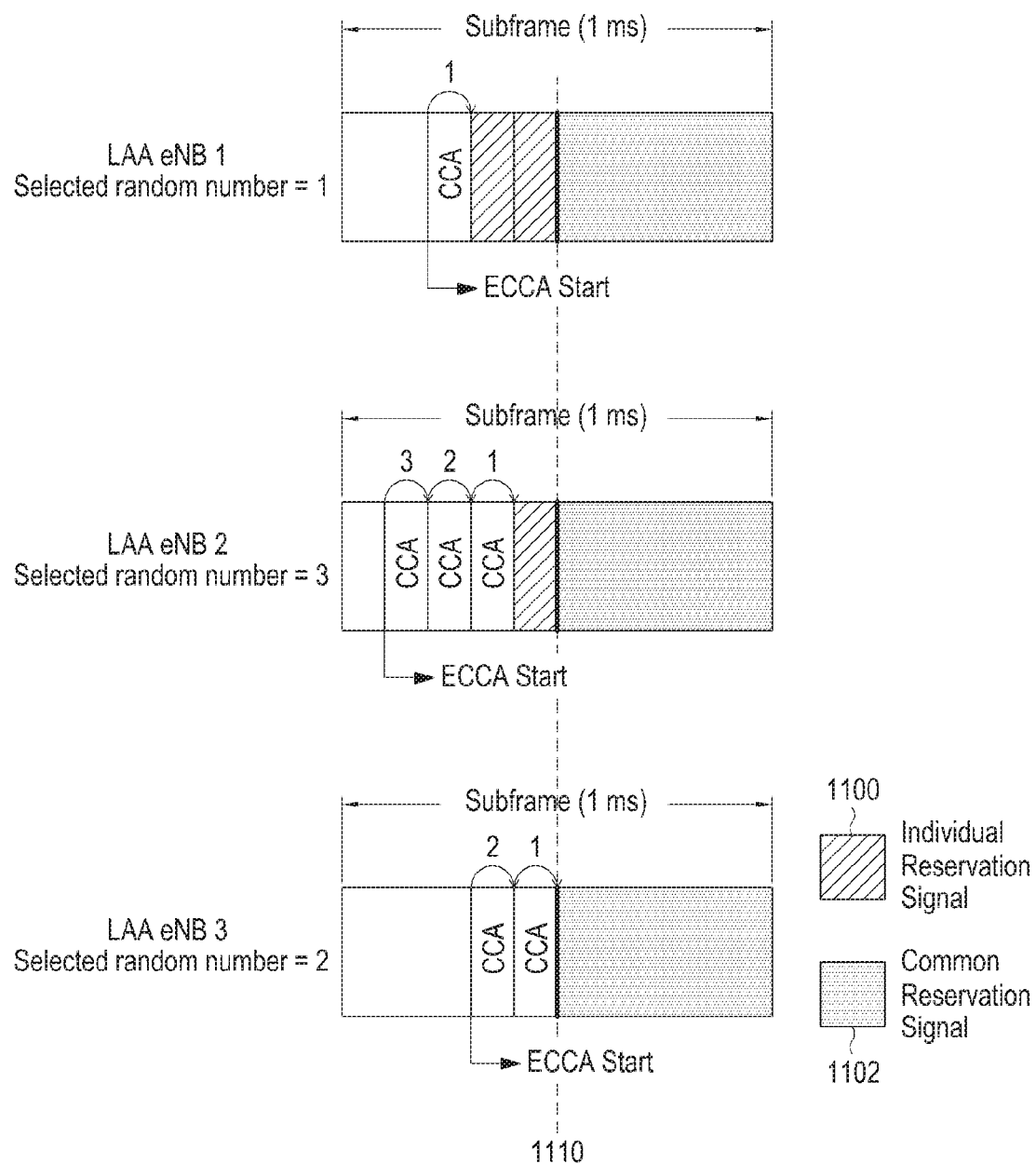
FIG. 11 is an exemplary diagram showing a method for synchronizing data transmission timings by a transmitter in LBE-based LBT using a reservation signal.

FIG. 11 is an exemplary diagram showing a method for synchronizing data transmission timings by a transmitter in LBE-based LBT using a reservation signal.

Multiple eNBs share information about a common reservation signal transmission timing 1110, and each of them sets its common reservation signal transmission timing to the shared common reservation signal transmission timing.

Each eNB, when transmitting a signal through a channel of an unlicensed band, may execute ECCA to determine whether signal transmission is possible.

In this case, the eNB may perform ECCA as described below.

The eNB selects a random number in a given range. The eNB starts executing ECCA at an arbitrary timing. If an individual reservation signal is not detected even if the eNB receives interference greater than a CCA threshold during execution of ECCA, then the eNB stops backoff counting. The individual reservation signal is transmitted by an individual eNB, and is a signal for reserving (pre-occupying) a channel with respect to other RAT transmitter instead of an LAA eNB, and an interference signal in which an individual reservation signal is not detected may be determined as signal transmission by other RAT transmitters. The individual reservation signal has been introduced to avoid a phenomenon in which an LAA eNB stops backoff counting due to a nearby LAA eNB. Thus, the individual reservation signal may include an identifier indicating that the transmitter is an LAA transmitter. To avoid backoff counting stop caused by a LAA eNB of the same operator only among LAA eNBs belonging to the same operator, the individual reservation signal may include a public land mobile network (PLMN) identifier (ID).

If, while executing ECCA, an eNB receives interference less than a CCA threshold, or receives interference greater than the CCA threshold and detects an individual reservation signal, the eNB does not stop backoff counting. This is because the individual reservation signal is transmitted by an individual eNB and if the individual reservation signal is detected, interference may be determined as a signal for channel reservation of an LAA eNB.

If an eNB passes ECCA, the eNB may transmit an individual reservation signal 1100 from the ECCA pass timing until the common reservation signal transmission timing 1110.

The eNB may transmit a common reservation signal from a preset common reservation signal transmission timing to a subframe boundary or a predefined timing. The common reservation signal is a channel reservation signal transmitted in common by multiple eNBs, and is a signal for reserving (or occupying) a channel for any RAT transmitter. After transmitting the common reservation signal until the subframe boundary or the predefined timing, the eNB transmits data and a signal (e.g., a CRS) used for reception of the data.

Herein, the individual reservation signal and the common reservation signal may be various signals including an initial signal, a reservation signal, a CRS, a PSS, an SSS, a discovery signal, a PDCCH, an ePDCCH, a PDSCH, etc. The UE receives the individual reservation signal and the common reservation signal to perform operations such as channel measurement, synchronization, AGC setting, etc.

In light of a UE, an advantage expected from FIGS. 5 and 11 is that a timing at which the UE first receives a signal after the eNB passes ECCA is fixed. Thus, the UE may more effectively perform the operations such as channel measurement, synchronization, AGC setting, etc., than when a related signal is transmitted at an arbitrary timing. This is because the UE may perform the operations such as channel measurement, synchronization, AGC setting, etc., at the fixed timing without needing to perform the operations at all times.

Figure 12:
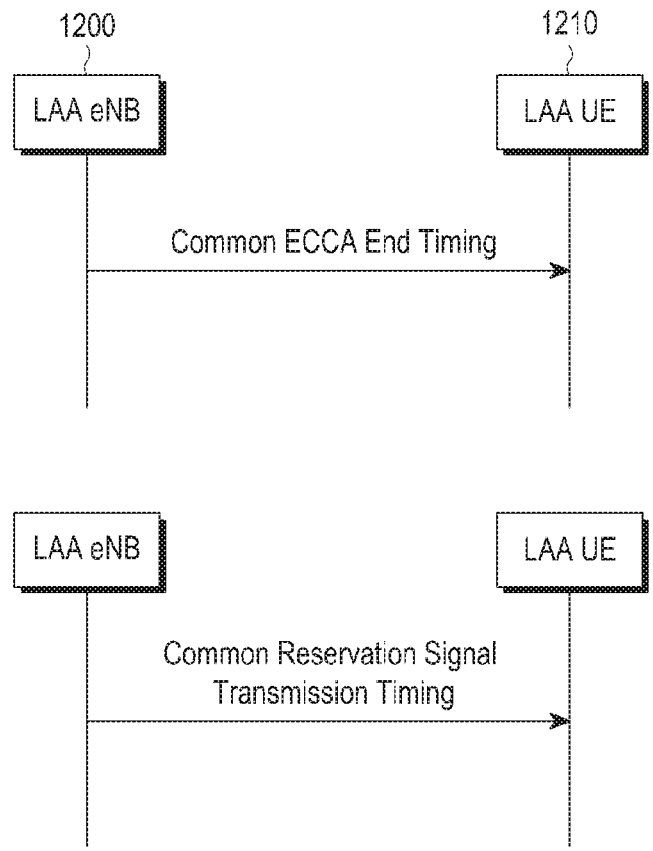
FIG. 12 is an exemplary diagram showing operations of providing information for efficient reception of a terminal by a base station.

FIG. 12 is an exemplary diagram showing operations of providing information for efficient reception of a UE by an eNB.

An LAA eNB 1200 notifies an LAA UE 1210 of information about an ECCA end timing or information about a common reservation signal transmission timing. The LAA eNB 1200 notifies the information about the ECCA end timing or the information about the common reservation signal transmission timing through a PDCCH, an ePDCCH, an RRC message, or the like.

The scheme described so far assumes that an eNB executes ECCA at all times. Such an assumption satisfies a current Wi-Fi operation. The proposed scheme according to the present disclosure may be applied in the same manner when an eNB executes both initial CCA and ECCA. Herein, when the eNB executes initial CCA, the eNB executes initial CCA and then performs immediate transmission if detecting a clear channel in one CCA slot and performs ECCA if detecting a busy channel in one CCA slot.

Figure 13A:
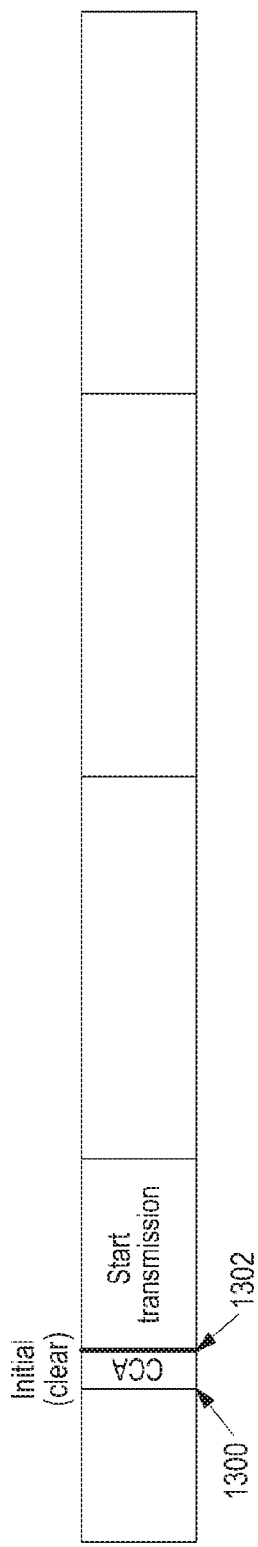
FIGS. 13A-13B are an exemplary diagram showing transmission operations when a transmitter detects a clear channel and when the transmitter detects a busy channel in initial CCA.
Figure 13B:
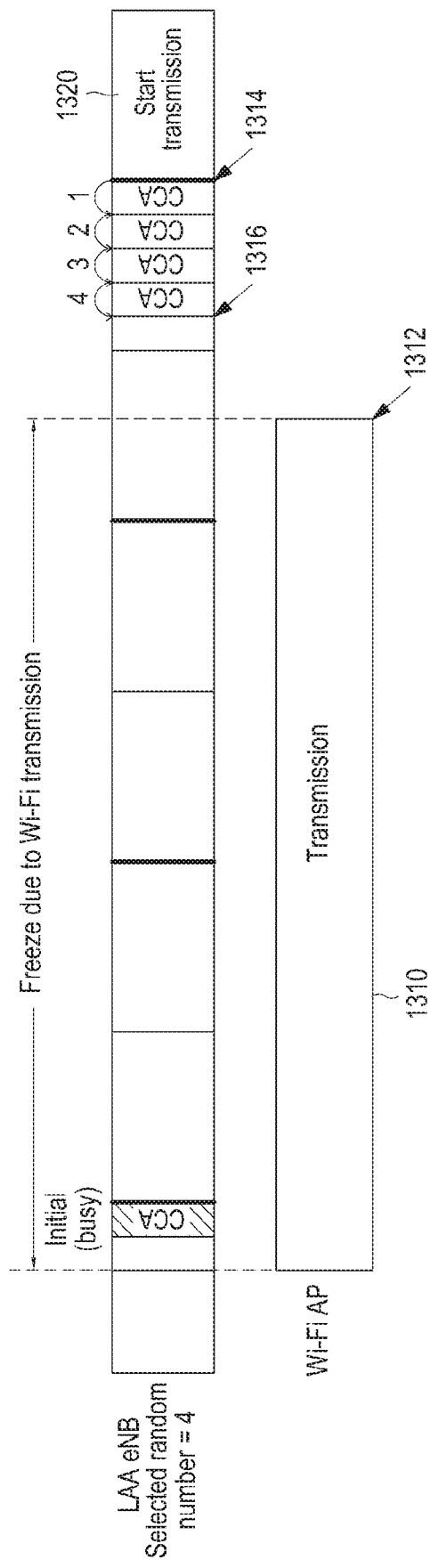

FIGS. 13A-13B is an exemplary diagram showing transmission operations when a transmitter detects a clear channel and when the transmitter detects a busy channel in initial CCA.

(FIG. 13A shows that an eNB executes initial CCA and detects a clear channel. Herein, an initial CCA execute timing 1300 may be set such that an initial CCA end timing 1302 coincides with an ECCA end timing set in common by multiple eNBs. The initial CCA execute timing 1300 may be a separately set arbitrary timing. The multiple eNBs may exchange information about the ECCA end timing with each other.

FIG. 13B shows that an eNB executes initial CCA and detects a busy channel. Since the eNB detects the busy channel in initial CCA, the eNB executes ECCA. Herein, a random number selected by the eNB for ECCA is assumed to be 4 (N=4). The LAA eNB executes initial CCA and determines that the channel is occupied by Wi-Fi transmission 1310. The LAA eNB attempts ECCA at a Wi-Fi transmission end timing 1312 and starts ECCA (backoff counting) at a timing 1316 preceding a previously given ECCA end timing 1314 by N=4. If detecting a clear channel four times, the eNB may perform transmission as in 1320.

The present proposed scheme may be applied to both when a CCA slot length applied to initial CCA and a CCA slot length applied to ECCA are equal to each other and when they are different from each other. For example, an initial CCA slot length may be 34 μs and an ECCA slot length may be equal to 34 μs or may be 9 μs or 10 μs different from 34 μs.

The proposed scheme described so far assumes that there is no explicit defer duration when an eNB executes initial CCA and ECCA.

Figure 14:
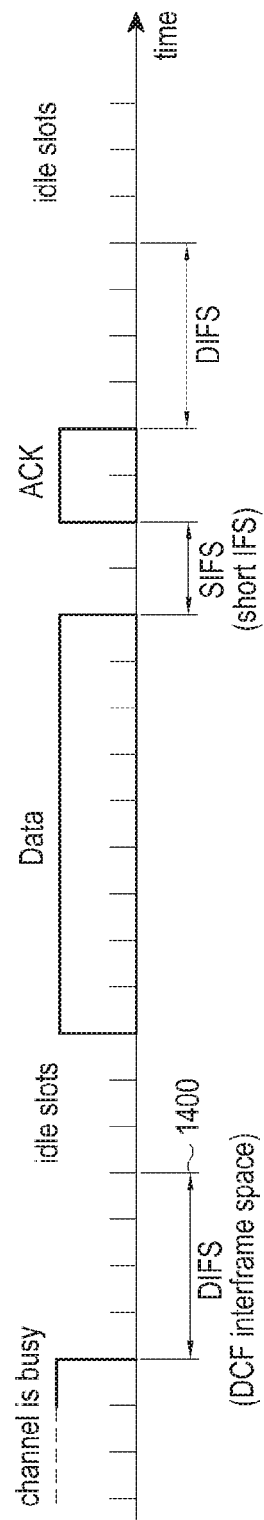
FIG. 14 is a diagram for describing a distributed coordination function (DCF) interframe space (DIFS) of Wi-Fi, which is an example of an explicit defer duration.

FIG. 14 is a diagram for describing a distributed coordination function (DCF) interframe space (DIFS) of Wi-Fi, which is an example of an explicit defer duration.

The explicit defer duration means a preset wait time from a timing of change to an idle state from a busy state of a channel measured by a transmitter like in a DIFS 1400 of Wi-Fi to an ECCA or random backoff start timing.

The proposed scheme according to the present disclosure may be applied to a case where an explicit defer duration exists. When executing initial CCA and ECCA, the eNB executes initial CCA and ECCA (backoff counting) after waiting during a preset time after a change of the measured channel from a busy state to a clear state, rather than executing initial CCA and ECCA (backoff counting) immediately upon the change of the measured channel from the busy state to the clear state, and the waiting time is the explicit defer duration.

Figure 15:
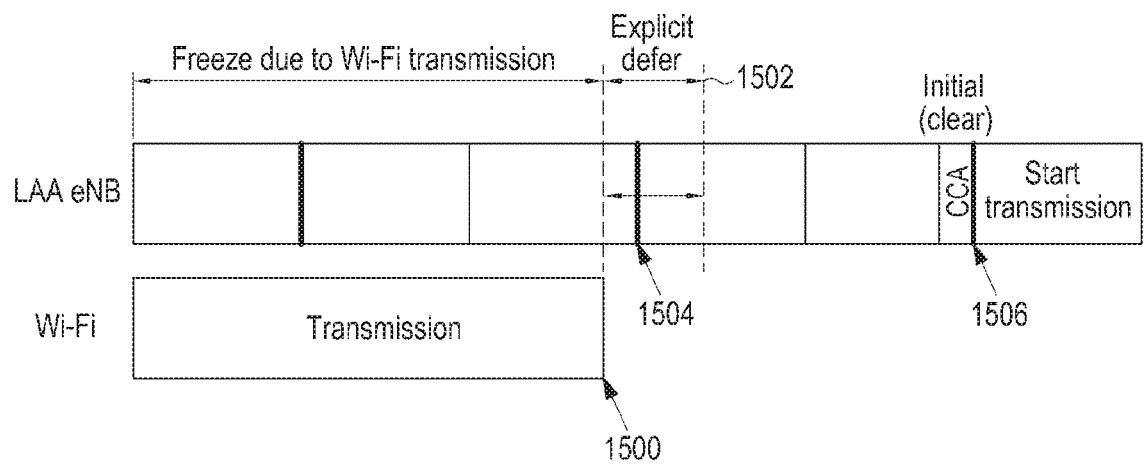
FIG. 15 is an exemplary diagram showing that an explicit defer duration is applied when initial CCA is executed.

FIG. 15 is an exemplary diagram showing that an explicit defer duration is applied when initial CCA is executed.

Instead of determining an initial CCA execute timing immediately after a channel occupancy end timing 1500 of Wi-Fi, that is, a change of a channel measured by the LAA eNB from the busy state to the clear state, the LAA eNB determines the initial CCA execute timing after an explicit defer duration 1502 from the channel occupancy end timing 1500 of Wi-Fi. If there is no explicit defer duration in a situation like FIG. 15, the LAA eNB detects a clear channel at a second initial CCA end timing 1504 and performs transmission; if there is the explicit defer duration 1502, the second initial CCA end timing 1504 falls within the explicit defer duration 1502, such that the LAA eNB may fail to execute initial CCA during the explicit defer duration 1502 and may detect a clear channel at a third initial CCA end timing 1506 and perform transmission.

Figure 16:
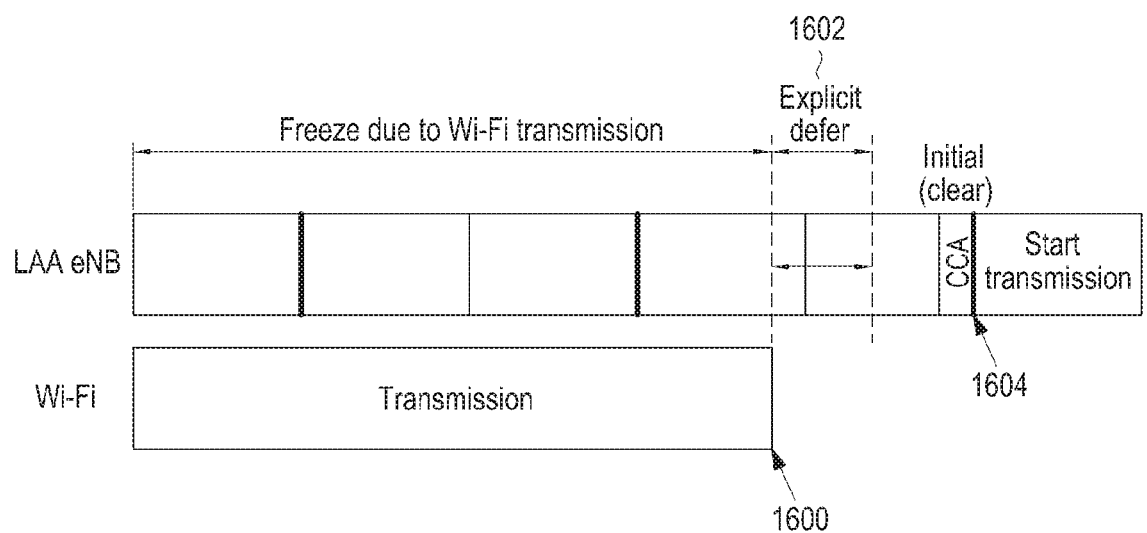
FIG. 16 is another exemplary diagram showing that an explicit defer duration is applied when initial CCA is executed.

However, whether there is an explicit defer duration may not affect an initial CCA execute timing in a proposed scheme. FIG. 16 shows this example.

FIG. 16 is an exemplary diagram showing that an explicit defer duration is applied when initial CCA is executed.

In FIG. 16, even if an eNB waits without executing initial CCA during an explicit defer duration 1602 immediately after a Wi-Fi transmission end timing 1600, that is, after a change of a channel measured by an eNB from a busy state to a clear state, the eNB determines an initial CCA execute timing by considering a preset initial CCA end timing. Thus, if the explicit defer duration 1602 does not include an initial CCA end timing 1604 and there is a sufficient time for execution of initial CCA after end of the explicit defer duration 1602, then existence or non-existence of the explicit defer duration does not affect the initial CCA execute timing.

Figure 17:
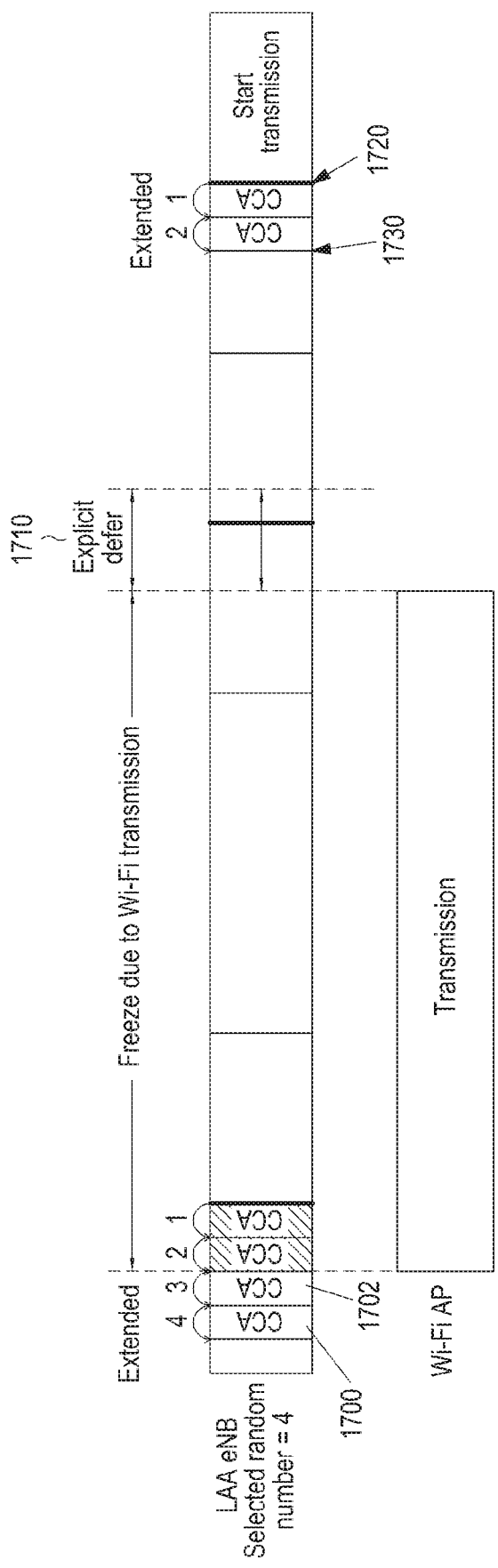
FIG. 17 is an exemplary diagram when a base station detects a busy channel during execution of ECCA and stops backoff counting until the channel becomes clear again.

FIG. 17 is an exemplary diagram when an eNB detects a busy channel during execution of ECCA and stops backoff counting until the channel becomes clear again.

If the eNB selects a random number of 4 for ECCA and detects a busy channel after detecting two clear CCA slots 1700 and 1702, the eNB waits until the channel becomes clear again and then further waits during an explicit defer duration 1710. After end of the explicit defer duration 1710, the eNB may perform transmission after further detecting two clear CCA slots, and since a preset ECCA end timing 1702 exists, the eNB performs ECCA (backoff counting) again at a timing 1730 preceding a preset ECCA end timing 1720 by two CCA slots. That is, the eNB may determine not to perform backoff counting until the timing 1730 preceding the preset ECCA end timing 1720 by two CCA slots is reached. If the eNB detects two clear CCA slots, the eNB may start transmission at the preset ECCA end timing 1720.

FIGS. 18A-18D are an exemplary diagram showing a scheme for synchronizing or aligning data transmission timings using an implicit defer duration by an eNB.

FIG. 18A, an ECCA end timing 1800 is preset through signaling among multiple eNBs, and the eNB starts ECCA at a timing 1802 preceding the ECCA end timing 1800 by a selected random number such that the eNB ends the ECCA at the preset ECCA end timing 1800.

FIGS. 18B and 18C illustrate modified operations.

FIG. 18B, the LAA eNB starts ECCA at a moment 1810 when transmission data is created and packetized, and waits without performing transmission during an implicit defer duration 1816 from an actual ECCA end timing 1812 to a preset ECCA end timing 1814, and then performs transmission at the preset ECCA end timing 1814. The LAA eNB waits without performing transmission during the implicit defer duration 1816 from the actual ECCA end timing 1812 to the preset ECCA end timing 1814, and during that duration 1816, an Wi-Fi AP may perform transmission, such that the duration 1816 may be useful for the Wi-Fi AP. This is also true in FIG. 18A.

FIG. 18C, the LAA eNB starts ECCA at a moment 1820 when transmission data is created and packetized, and continues ECCA until a timing 1822 immediately before the last CCA slot. The remaining last CCA 1824 is performed immediately before a preset ECCA end timing 1826. If the eNB passes the last CCA 1824, the eNB may start transmission at the preset ECCA end timing 1826. Herein, there is a duration 1828 during which the LAA eNB waits between the last CCA 1824 and its immediately previous CCA, and during the duration 1828, an Wi-Fi AP may perform transmission, such that the duration 1828 may be useful for the Wi-Fi AP. This is also true in FIG. 18A.

FIG. 18B may be modified into FIG. 18D.

FIG. 18D, the LAA eNB starts ECCA at a moment 1830 when transmission data is created and packetized, and the LAA eNB may transmit, from an actual ECCA end timing 1834 to a preset ECCA end timing 1832, an initial signal which is discussed in LAA standardization, a reservation signal 1836, a discovery signal, a sync signal, a reference signal (RS) such as a PSS, an SSS, a CRS, etc., or the like.

In FIGS. 18A-18D, multiple eNBs preset initial CCA and ECCA end timings through inter-eNB signaling. Thus, initial CCA and ECCA start timings are determined such that initial CCA and ECCA end at the preset initial CCA and ECCA end timings. Thus, there is a time duration during which an eNB inevitably performs no operation from a moment when transmission data is generated to a moment when the eNB executes initial CCA and ECCA. A length of that time duration changes with the moment when the transmission data is generated and a random number selected by the eNB for ECCA. Thus, the time duration is called an implicit defer duration.

As a modified form of the proposed scheme, a frequency reuse scheme using initial CCA may be provided. According to the LBT regulation, if detecting a clear channel after executing initial CCA including one CCA slot, an LBE may immediately perform transmission. Thus, in an eNB group desiring to achieve a frequency reuse rate of 1, an eNB(s) currently performing transmission pauses transmission during a specific period and an eNB(s) not currently performing transmission may detect a clear channel if executing initial CCA during the period in which the transmission is paused, thereby achieving a frequency reuse rate of 1. During the specific period in which the transmission is paused, a transmission blank period is generated, and thus that specific period is called a blank duration.

Figure 19:
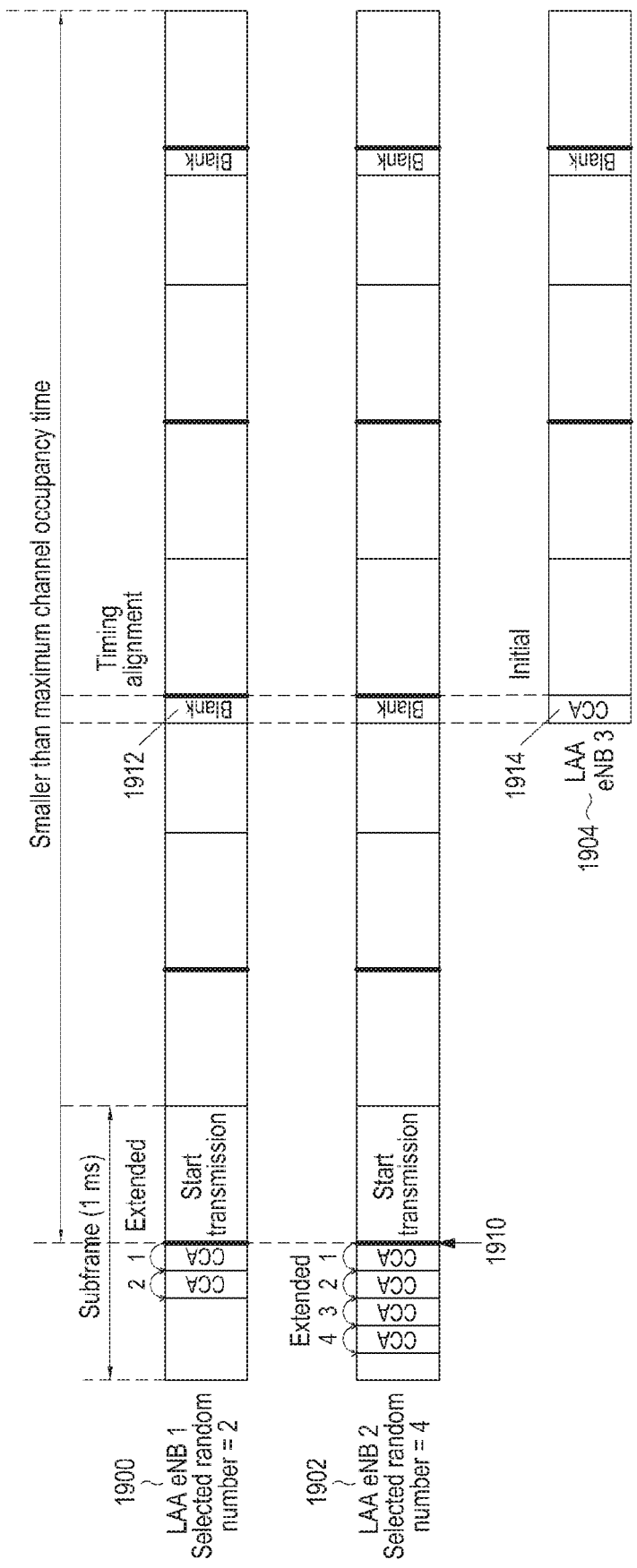
FIG. 19 is an exemplary diagram showing a method for achieving a frequency reuse rate of 1 by using a blank duration and initial CCA.

FIG. 19 is an exemplary diagram showing a method for achieving a frequency reuse rate of 1 by using a blank duration and initial CCA.

It is assumed that LLA eNBs 1 through 3 1900, 1902, and 1904 are located in a carrier sensing range with respect to one another. That is, if at least one of the LLA eNBs 1 through 3 perform transmission, the other eNBs detect a busy channel when executing initial CCA or ECCA. If the LAA eNB 1 1900 and the LAA eNB 2 1902 simultaneously perform transmission at a preset ECCA end timing 1910 after executing ECCA according to a proposed scheme, the LLA eNB 3 1904 having transmission data late detects a CCA-resulting busy channel until the LLA eNB 1 1900 and the LAA eNB 1902 ends transmission, and thus fails to obtain an opportunity to perform transmission. If the LLA eNB 1 1900 and the LLA eNB 2 1902 introduce a blank duration 1912 at specific time intervals and temporarily stop transmission during the blank duration 1912, the LLA eNB 3 1904 may avoid detecting a CCA-resulting busy channel by executing CCA 1914 during the blank duration 1912. If receiving interference greater than a CCA threshold from a Wi-Fi device or LAA eNB other than the LAA eNB 1 1900 and the LAA eNB 2 1902 in the blank duration 1912, the LAA eNB 3 1904 may detect a busy channel and thus fail to perform transmission.

Herein, a length of a blank duration may be equal to or longer than a length of an initial CCA slot.

A position of a blank duration may be, for example, as follows:
 a timing coinciding with an ECCA end timing
 an independent timing separate from an ECCA end timing
 the first symbol of every subframe
 the last symbol of every subframe
 a symbol in which an initial signal is planned to be transmitted An occurrence period of a blank duration may be, for example, as follows:
 arbitrary N subframes (N=1, 2, 3, . . . )
 Maximum channel occupancy time An eNB may exchange information about a blank duration with nearby another eNB.
 The information about the blank duration may include a length of the blank duration, a position of the blank duration, an occurrence interval of the blank duration, etc.

A way to exchange the information about the blank duration may be a scheme using an X2 interface, and may be a scheme in which the LLA eNB transmits the information in an LAA preamble, an initial signal, a reservation signal, etc., through an air interface.

Instead of not completely transmitting a signal in the blank duration, a signal may be transmitted with low power.

Figure 20:
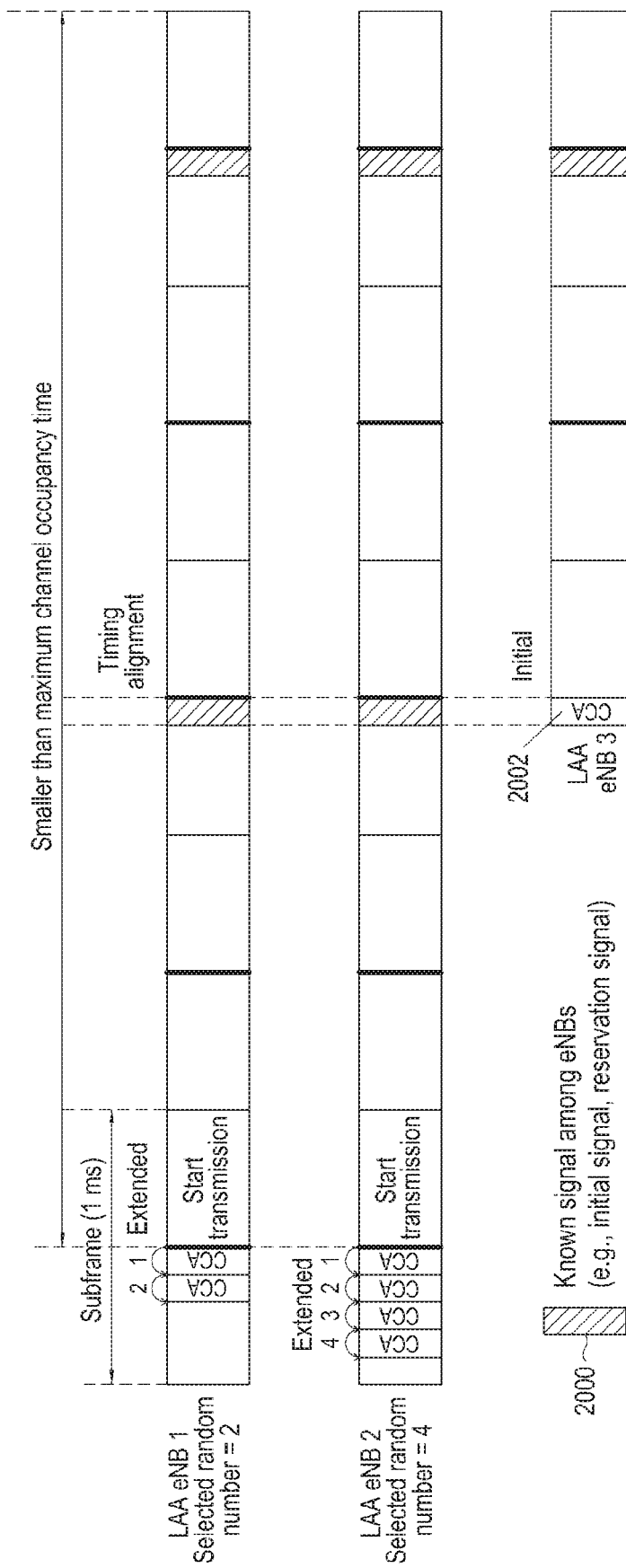
FIG. 20 is an exemplary diagram showing a method for achieving a frequency reuse rate of 1 by using a known signal transmitted for a specific duration and initial CCA.

FIG. 20 is an exemplary diagram showing a method for achieving a frequency reuse rate of 1 by using a known signal transmitted for a specific period and initial CCA.

An LAA eNB transmits a known signal with low transmission power in a specific duration (e.g., a time corresponding to the blank duration). In an eNB group desiring to achieve frequency reuse, an eNB(s) not currently performing transmission is affected by low interference from an eNB(s) currently performing transmission, increasing a probability of achieving a frequency reuse rate of 1.

In the eNB group desiring to achieve frequency reuse, the eNB(s) currently performing transmission transmits a predefined signal 2000 at a pre-agreed timing. Herein, the predefined signal is known among the eNB(s), and may also be an initial signal, a reservation signal, a discovery signal, a sync signal such as a PSS, an SSS, a CRS, etc., an RS, etc. that are currently discussed in LAA standardization. In the eNB group desiring to achieve frequency reuse, the eNB(s) not currently performing transmission executes initial CCA 2002 at a pre-agreed timing. When a clear or busy state of a channel is determined, the determination is based on power of the other signal except for a strength of a signal to be transmitted at a pre-agreed timing by eNBs included in the eNB group. That is, whether the channel is clear/busy may be determined according to criterion provided below.

TABLE 1

If total received power - received power from the pre-defined signal that is known among LAA eNBs > CCA threshold, a channel is busy
Total received power - received power from the pre-defined signal that is known among LAA eNBs < CCA threshold, a channel is clear Herein, a length of a transmission duration of a predefined signal may be equal to or longer than a length of an initial CCA slot.

A position of the transmission duration of the predefined signal may be as follows:
 a timing coinciding with an ECC end timing known in the proposed scheme
 an independent timing separate from the ECC end timing known in the proposed scheme
 the first symbol of every subframe
 the last symbol of every subframe
 a symbol in which an initial signal is planned to be transmitted An occurrence interval of a transmission duration of a known signal may be as follows:
 arbitrary N subframes (N=1, 2, 3, . . . )
 Maximum channel occupancy time An eNB exchanges information about a transmission duration of a known signal with nearby another eNB.
 Herein, the information about the transmission duration of the known signal includes a length of the transmission duration of the known signal, a position of the transmission duration of the known signal, an occurrence interval of the transmission duration of the known signal, etc.

A way to exchange the information about the transmission duration of the known signal may be a scheme using an X2 interface, and may be a scheme in which the LLA eNB transmits the information in an LAA preamble, an initial signal, a reservation signal, etc., through an air interface.

Figure 21A:
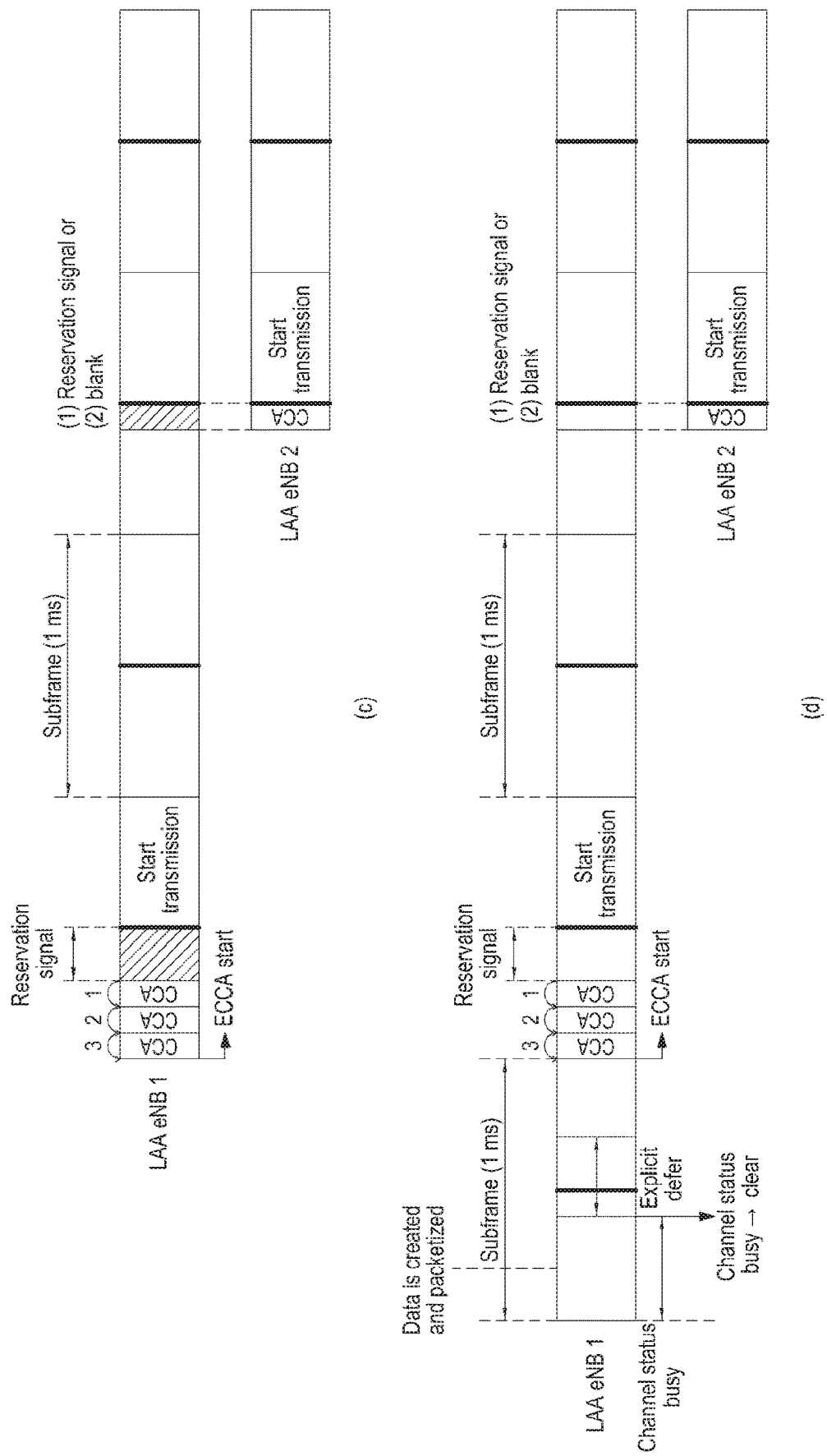
FIGS. 21A and 21B are exemplary diagrams showing an LBT method that selectively applies an initial signal, a blank duration, and an explicit defer duration according to the present disclosure.
Figure 21B:
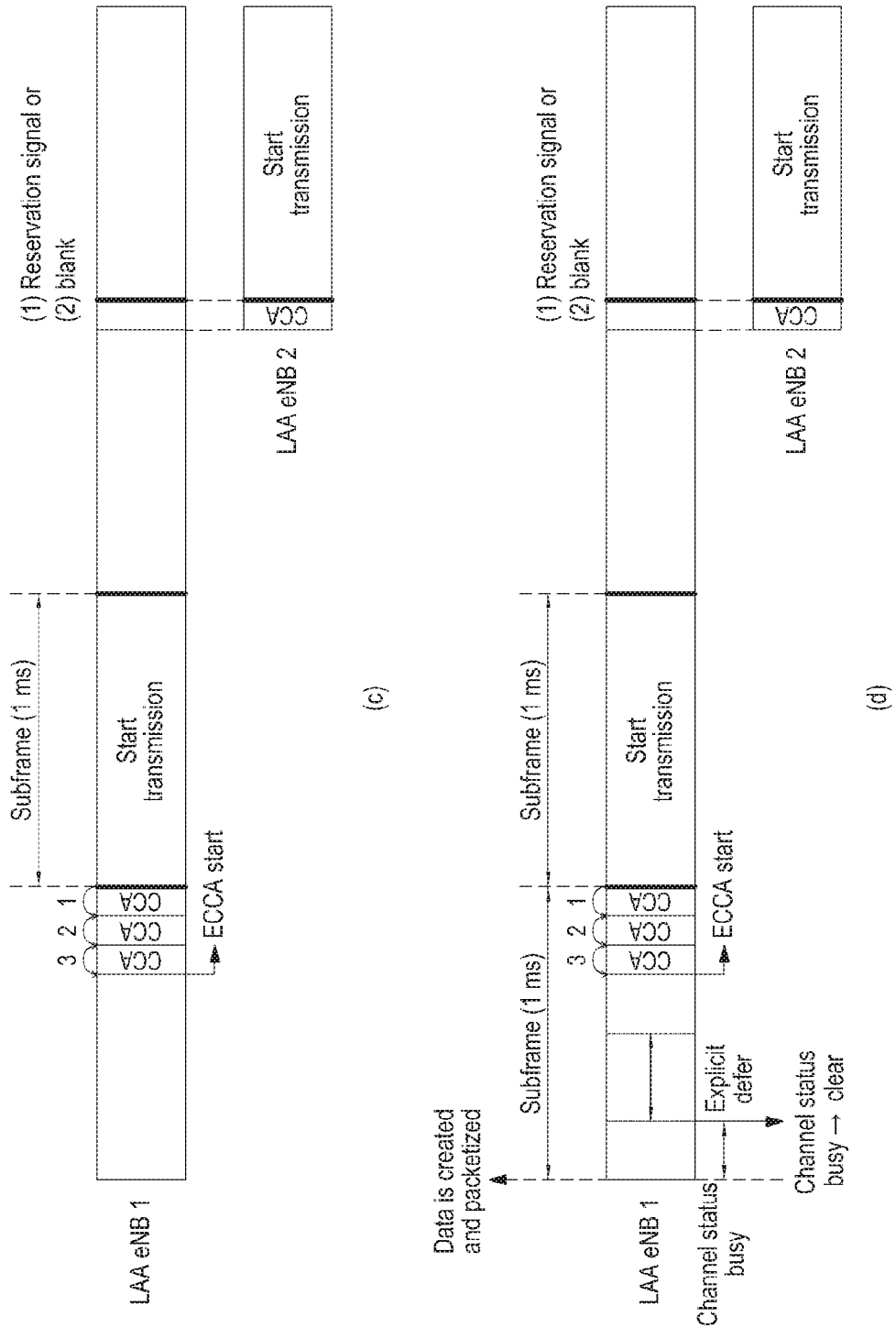

FIGS. 21A and 21B are exemplary diagrams showing an LBT method that selectively applies an initial signal, a blank duration, and an explicit defer duration according to the present disclosure.

(a) and (c) of FIGS. 21A and 21B show a case where a blank duration or an initial signal according to the present disclosure is used. (b) and (d) of FIGS. 21A and 21B show a case where a blank duration or an initial signal and an explicit defer duration according to the present disclosure are used.

Figure 22:
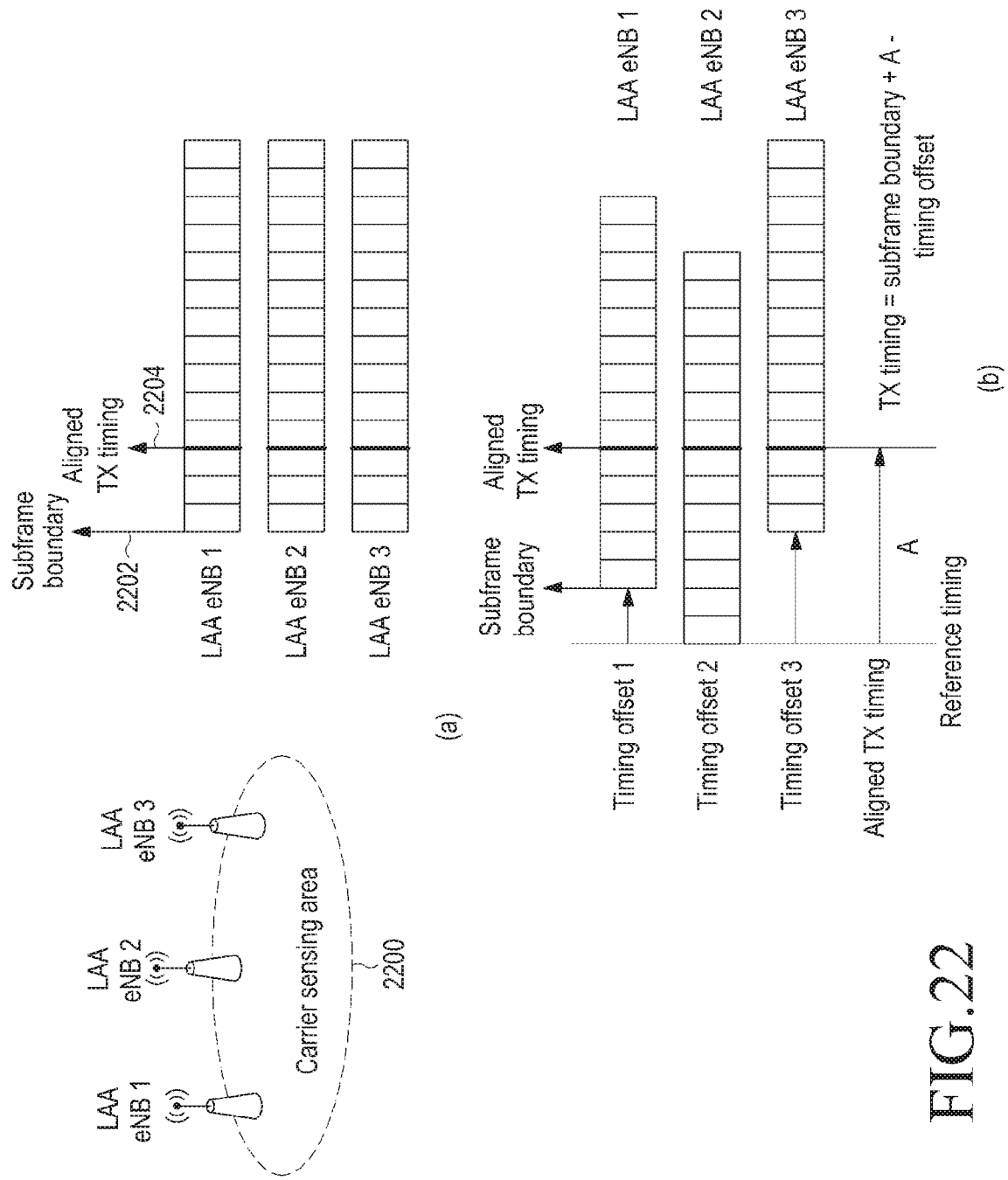
FIG. 22 is an exemplary diagram showing a method for aligning (or synchronizing) transmission timings by using transmission timing information or offset.

FIG. 22 is an exemplary diagram showing a method for aligning transmission timings by using transmission timing information or offset.

The present disclosure considers a method in which multiple eNBs in a carrier sensing area 2200 align transmission start timings for frequency reuse and perform transmission. For example, multiple eNBs share an ECCA end timing and if ECCA ends at the shared timing, the eNBs simultaneously perform transmission. To this end, the multiple eNBs in the carrier sensing area 2200 may exchange information about a transmission start timing with each other.

(a) of FIG. 22 shows a case where multiple eNBs are synchronized with one another.

If the multiple eNBs are synchronized with one another, that is, if frame boundaries or subframe boundaries 2202 of the multiple eNBs coincide with one another, the eNBs may simultaneously perform transmission merely by sharing information about an aligned transmission (TX) timing 2204. An example of the information about the aligned TX timing may include information about a symbol boundary or a subframe boundary at which transmission starts.

However, as shown in (b) of FIG. 22, if the multiple eNBs in the carrier sensing area 2200 are not synchronized with one another (for example, if the frame boundaries or subframe boundaries of the multiple eNBs do not coincide with one another), the eNBs have to share information about synchronization differences among the eNBs as well as information about transmission timings to align the transmission timings. That is, if there is a high-layer entity for managing LAA eNBs 1 through 3 (e.g., an LAA eNB, an MME, etc., serving as a cluster header), the high-layer entity may collect information about differences in frame boundary, subframe boundary, or symbol boundary of the eNBs with respect to a particular timing. As shown in (b) of FIG. 22, the high-layer entity delivers aligned TX timing information (indicated by 'A') with respect to a particular reference timing and timing offset information of each eNB with respect to the particular reference timing to each eNB. Each eNB having received the aforementioned information subtracts a timing offset with respect to the particular reference timing from a sum of the particular reference timing and the aligned TX timing A, and then recognizes a timing delayed from its subframe boundary (or frame boundary or symbol boundary) by the subtraction result as a common TX start timing. To sum up, eNBs need to exchange synchronization offset information with respect to a particular reference timing and aligned TX timing information with respect to the particular reference timing with one another.

With reference to FIG. 22, a description has been made of an operation in which the eNBs in the carrier sensing area 2200 exchange synchronization offset information with respect to a particular reference timing and aligned TX timing information with respect to the particular reference timing with one another, to align the TX start timings.

Figure 23:
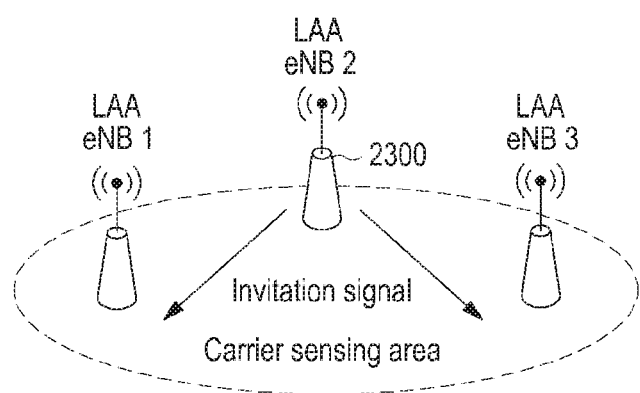
FIG. 23 is an exemplary diagram of a system for aligning transmission timings based on an invitation signal.

FIG. 23 is an exemplary diagram of a system for aligning transmission timings based on an invitation signal.

As another method for aligning transmission timings among eNBs, as shown in FIG. 23, a particular eNB 2300 in a carrier sensing area may transmit an invitation signal and the other eNBs in the carrier sensing area may set a timing at which they receive the invitation signal to an aligned transmission timing. Herein, the invitation signal may include a reservation signal, an initial signal, a discovery signal, a sync signal such as PSS/SSS/CRS, etc., an RS, or the like, and eNBs in a carrier sensing area, upon receiving a particular sequence or identifier, etc., in the invitation signal, may recognize that the invitation signal is a signal for aligning transmission start timings. When a particular eNB in a carrier sensing area transmits an invitation signal and the other eNBs in the carrier sensing area receive the invitation signal, the eNB having transmitted the invitation signal and the eNBs having received the invitation signal may set timings after a T timing from a moment when the invitation signal is transmitted and a moment when the invitation signal is received as common transmission start timings. This may be expressed as equations.

(eNB having transmitted the invitation signal) aligned $TX$ timing=$Ttx+T$offset (eNB having received the invitation signal) aligned $TX$ timing=$Trx+T$offset Ttx and Trx are the moment when the invitation signal is transmitted and the moment when the invitation signal is received, respectively. The multiple eNBs in the carrier sensing area exchange information through an X2 interface or an air interface to share information about Toffset.

Figure 24:
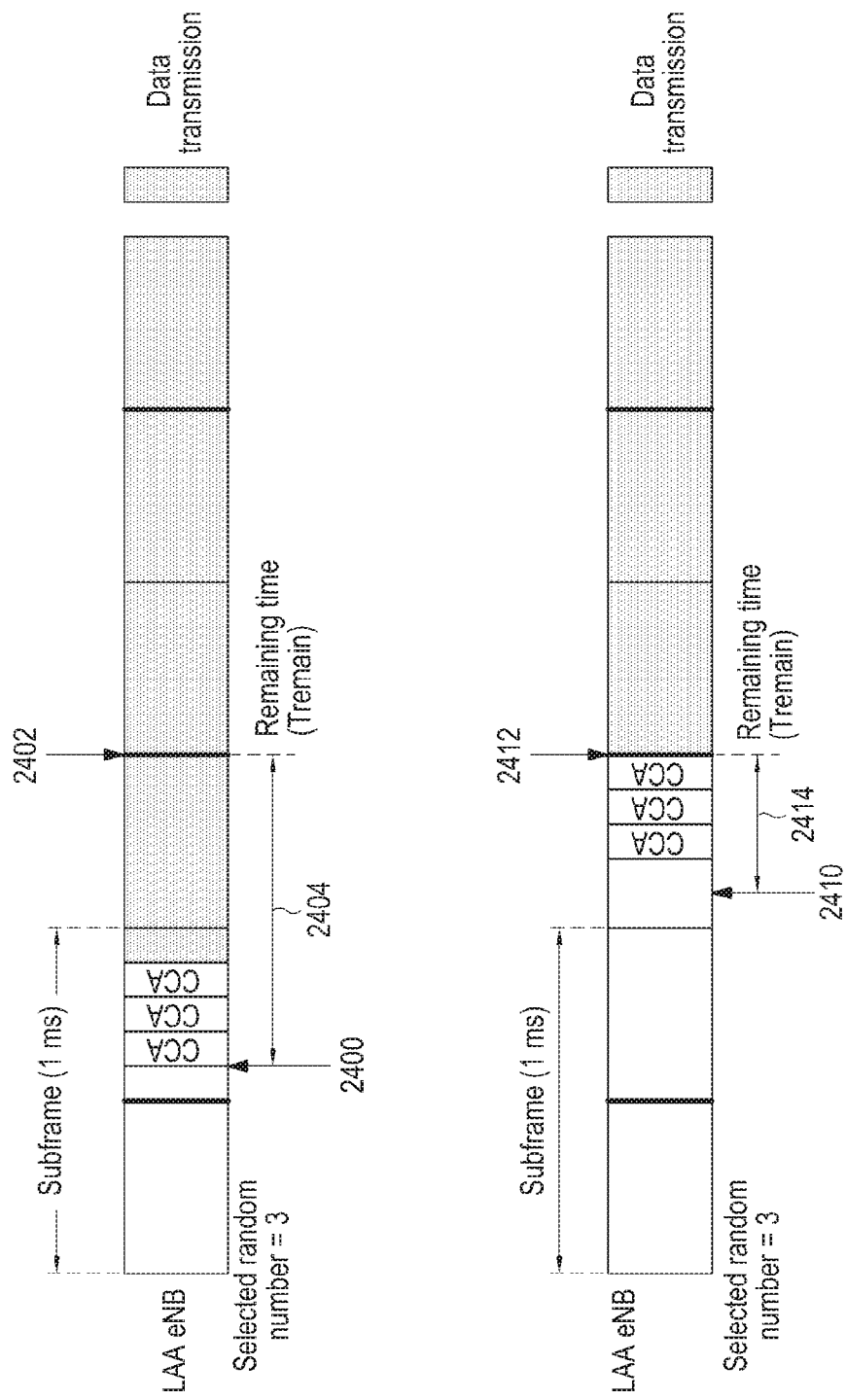
FIG. 24 is an exemplary diagram showing a method employing a scheme according to the present disclosure with respect to a remaining time from a moment when data is generated or created to an ECCA end timing.

FIG. 24 is an exemplary diagram showing a method employing a scheme according to the present disclosure with respect to a remaining time from a moment when data is generated to an ECCA end timing.

A transmitter determines an ECCA start timing such that ECCA ends at a preset ECCA end timing for frequency reuse, and in this case, a wait time (i.e., an implicit defer duration) is generated from a moment when data is generated to the ECCA start timing. Thus, depending on remaining times 2404 and 2414 from moments 2400 and 2410 when data is generated to the closest ECCA end timings 2402 and 2412, whether to apply a proposed scheme may be determined. For example, the transmitter may operate as follows:

(1) calculates the remaining times Tremain 2404 and 2414 from the moments when the data is generated to the closest ECCA end timings;

(2) compares Tremain with a threshold Tthreshold;

(3) immediately starts ECCA without following the proposed scheme as shown in (a) of FIG. 24, if Tremain is greater than the threshold Tthreshold. This is intended to prevent a wait time of the transmitter from increasing excessively. As the transmitter immediately executes ECCA and reserves (occupies) a channel, a transmission priority is given to the transmitter;

(4) if Tremain is less than the threshold Tthreshold, sets an ECCA start timing such that ECCA ends at a preset ECCA end timing according to a proposed scheme as shown in (b) of FIG. 24; and (5) to perform such operations, LAA eNBs may share the threshold Tthreshold with one another. A sharing method may include signaling through an X2 interface, signaling using an LTE DL control message, or signaling using a signal newly designed in current LAA standardization, such as a reservation signal, an initial signal, a discovery signal, etc.

Part 9

Figure 25:
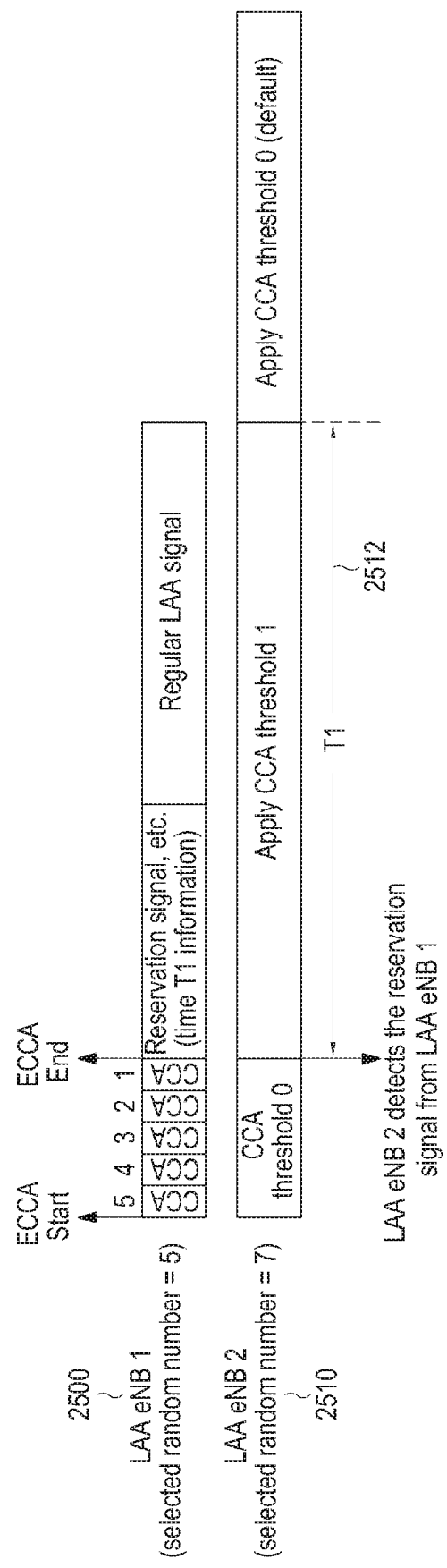
FIG. 25 is a diagram showing a scheme adaptively using a CCA threshold based on a reservation signal and time information.

FIG. 25 is a diagram showing a scheme adaptively using a CCA threshold based on a reservation signal and time information.

A method will be described in which an LAA eNB receives a reservation signal (or an initial signal) transmitted by a nearby LAA eNB and adjusts its applied CCA threshold.

Suppose that a random number selected by an LAA eNB 1 2500 for execution of ECCA is 5. The LAA eNB 1 2500 detects five clear CCA slots and then starts transmission. An assumption will be made and used in which a reservation signal having a preset or variable length is transmitted before the LAA eNB 1 2500 transmits an LAA signal (i.e., data).

The LAA eNB 1 2500 transmits a reservation signal before transmitting an LAA signal, and the reservation signal may include time information T1. Herein, a way to include the time information T1 in the reservation signal may use a sequence form (i.e., including only a sequence that one-to-one corresponds to a value of T1) or a message form (i.e., directly including a value of T1). Herein, the reservation signal may be detected by an LAA eNB managed by an identical MNO or a different MNO. Thus, an LAA eNB 2 2510 having detected the reservation signal transmitted by a nearby eNB, i.e., the LAA eNB 1 2500 and having recognized the time information T1 uses a default CCA threshold 0 in a normal situation, and applies a CCA threshold 1 that is different from the CCA threshold 0 during a time T1 2512 from the moment when detecting the reservation signal.

The CCA threshold is an upper limit of a magnitude of an interference signal for determining a channel to be a clear channel, such that a greater CCA threshold means a higher probability of a CCA result being the clear channel. Consequently, if the CCA threshold 1 is greater than the CCA threshold 0, an LAA eNB having detected the reservation signal has a higher probability of passing CCA check (detecting a clear channel), and a probability of simultaneous transmission, i.e., frequency reuse, among LAA eNBs increases. Herein, the time T1 2512 may be regarded as a time during which an eNB having passed ECCA occupies a channel until executing CCA/ECCA again. Thus, the LAA eNB 2 2510 detecting the reservation signal before the LAA eNB 1 2500 ends channel occupancy may perform transmission simultaneously with the LAA eNB 1 2500.

Figure 26:
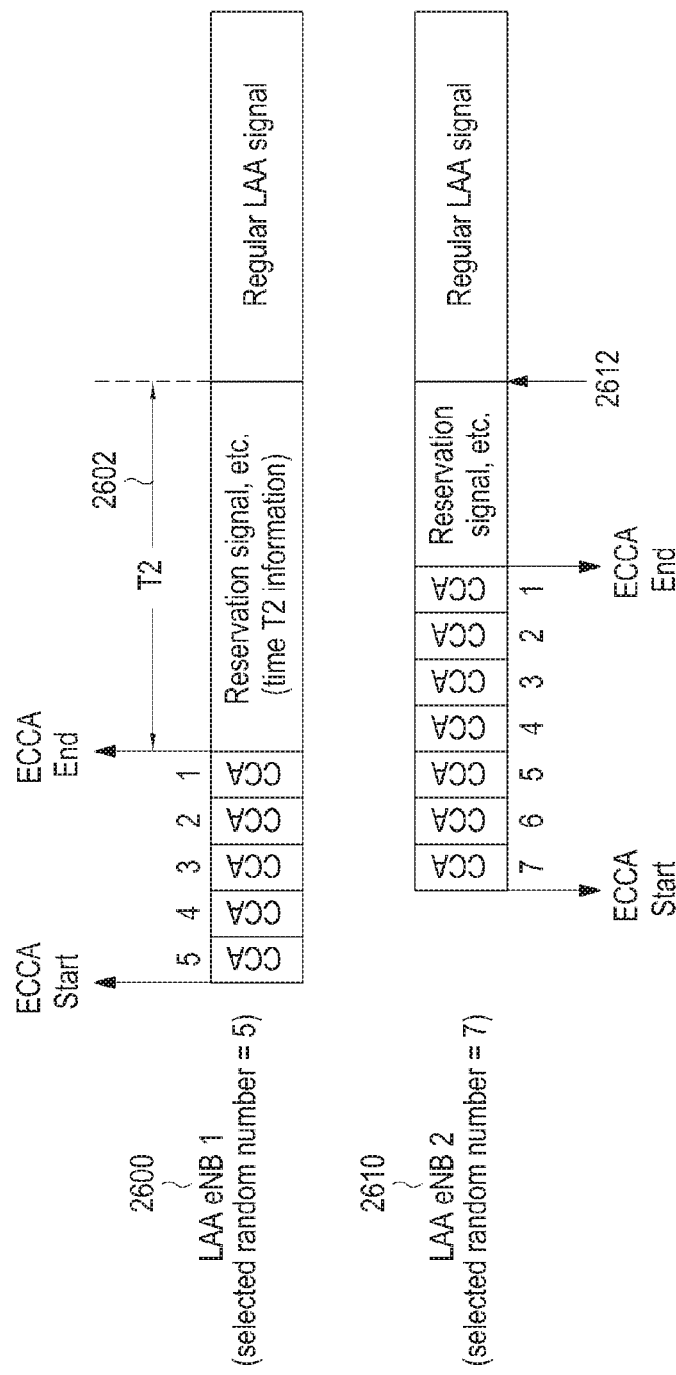
FIG. 26 is an exemplary diagram showing a method for achieving frequency reuse by using a reservation signal transmitted from a neighboring base station and length information of the reservation signal.
Figure 27:
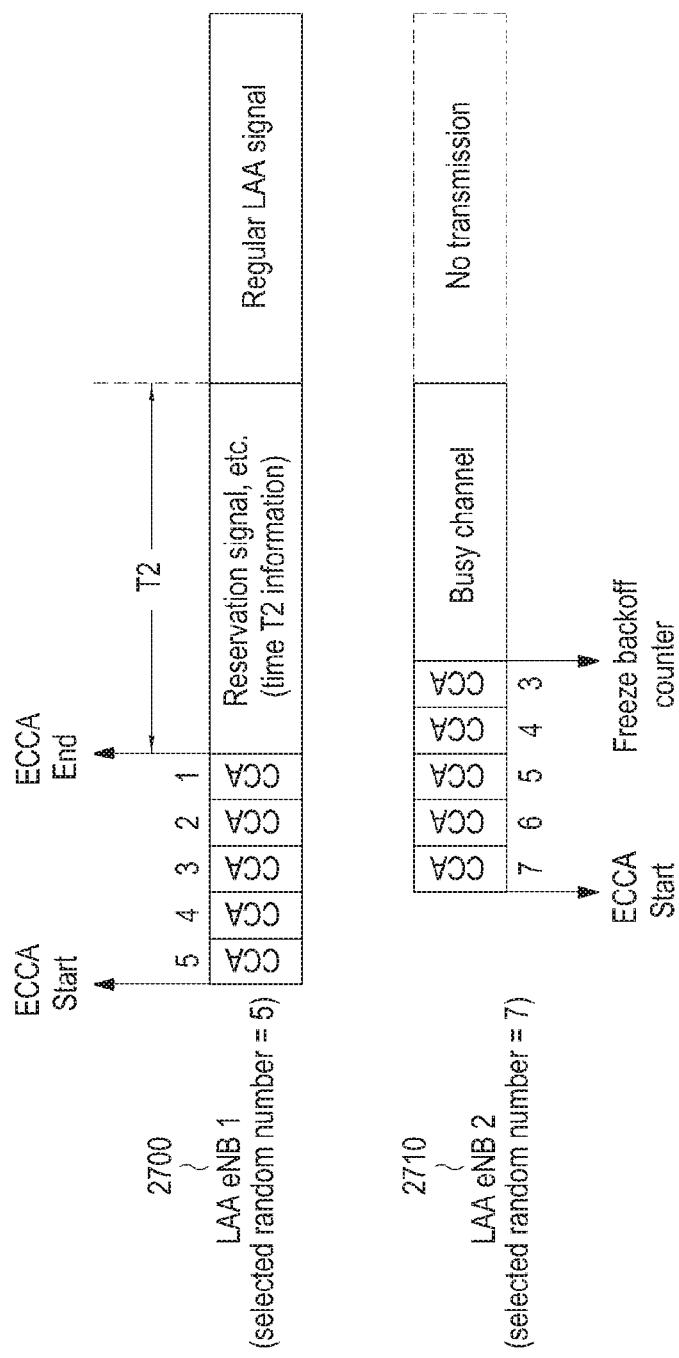
FIG. 27 is an exemplary diagram showing a failure in frequency reuse in spite of application of a proposed scheme.
Figure 28:
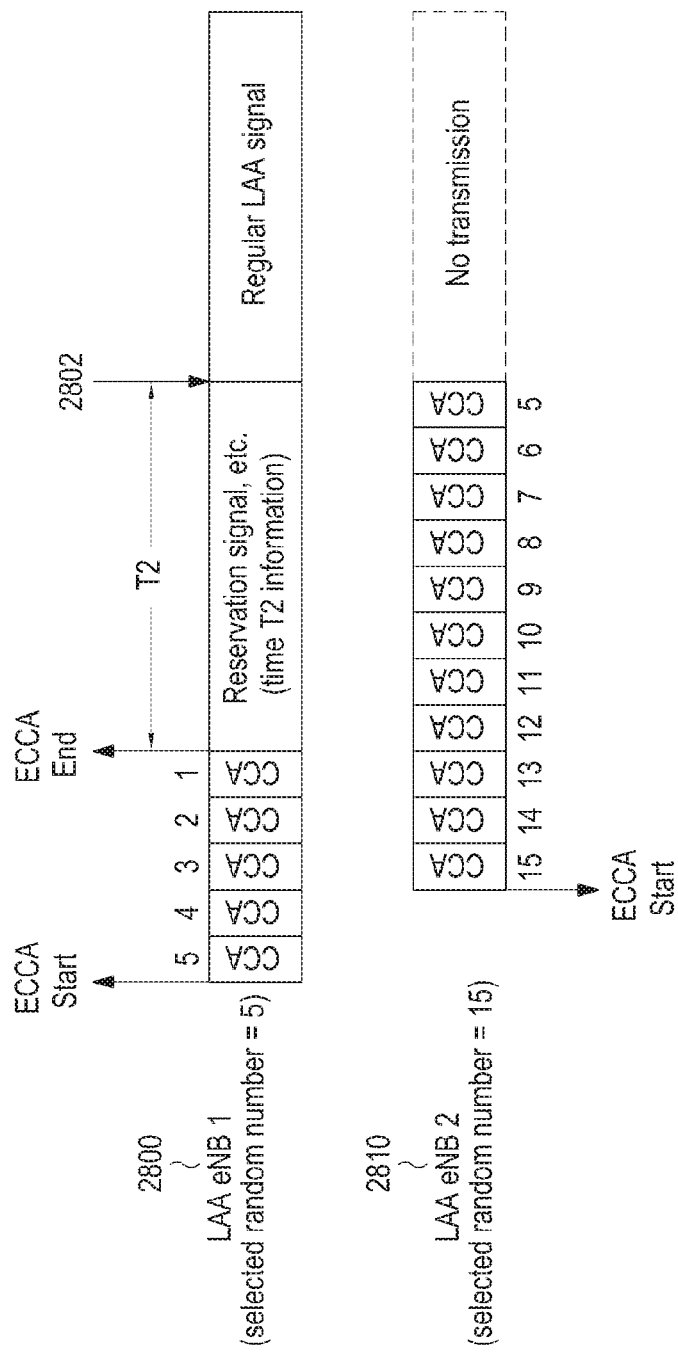
FIG. 28 is an exemplary diagram showing a failure in frequency reuse in spite of application of a proposed scheme.

Referring to FIGS. 26, 27, and 28, a method for achieving a frequency reuse rate of 1 by using a reservation signal transmitted by a nearby eNB and a transmission wait time will be described. Generally, LAA eNBs execute ECCA independently of one another. That is, each eNB starts ECCA at its independent timing and ends ECCA at its independent timing because of independently selecting a random number for ECCA. As a result, simultaneous transmission, that is, frequency reuse, among LAA eNBs is not easy to achieve. Therefore, the present disclosure will propose a method in which each LAA eNB independently executes ECCA, but adjusts a length of a reservation signal transmitted after the end of ECCA to achieve frequency reuse among LAA eNBs.

FIG. 26 is an exemplary diagram showing a method for achieving frequency reuse by using a reservation signal transmitted from a neighboring base station and length information of the reservation signal.

It is assumed that an LAA eNB 1 2600 selects a random number of 5 for ECCA and an LAA eNB 2 2610 selects a random number of 7 for ECCA. An ECCA start timing of each eNB is indicated in FIG. 26. In this case, the LAA eNB 1 2600 ends ECCA prior to the LAA eNB 2 2610. The LAA eNB 1 2600 having ended ECCA transmits a reservation signal during a time T2 2602. The time T2 2602 may be a value predefined by an LAA system, or may be set each time the LAA eNB transmits a reservation signal and thus may be included in the reservation signal in the form of a sequence (i.e., including only a sequence that one-to-one corresponds to a value of T2) or a message (i.e., directly including a value of T2). If the LAA eNB 1 2600 transmits a reservation signal during the time T2 2602 after ending ECCA and the LAA eNB 2 2610 detects the reservation signal, then the LAA eNB 2 2610 executes CCA, i.e., determines whether a channel is busy or clear, excluding interference of the reservation signal transmitted by the LAA eNB 1 2600 from total reception interference. For portions indicated by 4, 3, 2, and 1 of ECCA of the LAA eNB 2 2610, the LAA eNB 2 2610 executes ECCA, excluding interference by the reservation signal transmitted by the LAA eNB 1 2600 from total reception interference.

Once the LAA eNB 2 2610 having detected the reservation signal transmitted by the LAA eNB 1 2600 ends ECCA, the LAA eNB 2 2610 transmits the reservation signal by using the information T2 included in the reservation signal transmitted by the LAA eNB 1 2600 until a moment 2612 when the LAA eNB 1 completes transmission of the reservation signal. After the completion moment 2612, the LAA eNBs 1 and 2 simultaneously transmit regular LAA signals (e.g., data). By using a feature that LAA eNBs managed by an identical MNO or different MNOs may detect reservation signals transmitted from counterpart eNBs, frequency reuse may be achieved as shown in FIG. 26.

However, even if the proposed scheme is used, that is, even if a reservation signal is transmitted during the time T2 after end of ECCA, frequency reuse may not be achieved at all times.

FIGS. 27 and 28 show an example of a failure in frequency reuse in spite of application of the proposed scheme.

In FIG. 27, it is assumed that an LAA eNB 1 2700 selects a random number of 5 for ECCA and an LAA eNB 2 2701 selects a random number of 7 for ECCA. The LAA eNB 1 2700 ends ECCA and transmits a reservation signal for a time T2, but the LAA eNB 2 2710 executes ECCA up to 3, and upon detection of a busy channel due to interference caused by nearby Wi-Fi transmission, freezes (i.e., stops) random backoff counting. In this case, the LAA eNB 1 2700 transmits a regular LAA signal after transmitting a reservation signal during the time T2 after ending ECCA, such that if the LAA eNB 2 2710 fails to end ECCA before the LAA eNB 1 2700 ends transmission of the reservation signal, a frequency reuse rate of 1 may not be achieved.

Like FIG. 27, FIG. 28 shows an example where an eNB fails in frequency reuse in spite of attempting frequency reuse by using a reservation signal transmitted by a nearby eNB and time T2 information. If the time T2 during which an LAA eNB 1 2800 transmits a reservation signal is much shorter than a time consumed by an LAA eNB 2 2810 to execute ECCA, the LAA eNB 2 2810 may not be able to end ECCA until a moment 2802 when the LAA eNB 1 2800 ends ECCA and completes transmission of the reservation signal. As a result, frequency reuse fails, and only the LAA eNB 1 2800 performs transmission.

Figure 29:
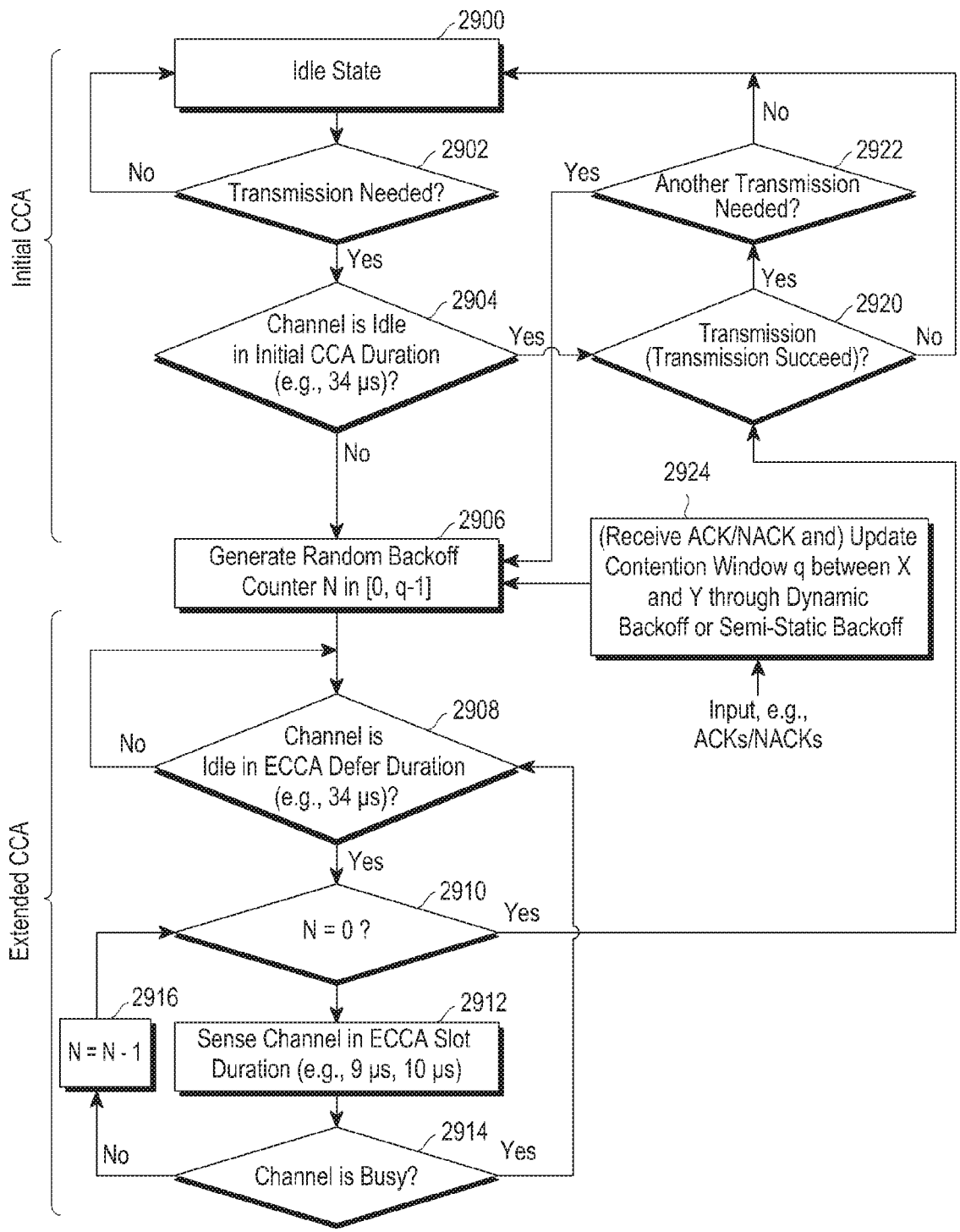
FIG. 29 is a flowchart of an LBT method operating in an unlicensed band.

FIG. 29 is a flowchart of an LBT method operating in an unlicensed band.

Referring to FIG. 29, an LAA eNB is designed to perform backoff counting (that is, to decrement a backoff counter like N=N−1) if detecting a clear channel in a process of executing ECCA (including operations 2900, 2902, 2904, 2906, 2908, 2910, 2912, and 2914). Such designing makes it difficult for an eNB to pause backoff counting and to intentionally defer transmission.

Thus, in the present disclosure, even if detecting a clear channel in a process of executing ECCA, the eNB maintains a backoff counter by decrementing the backoff counter to enable intentional transmission delay (deferring) of the eNB.

Figure 30:
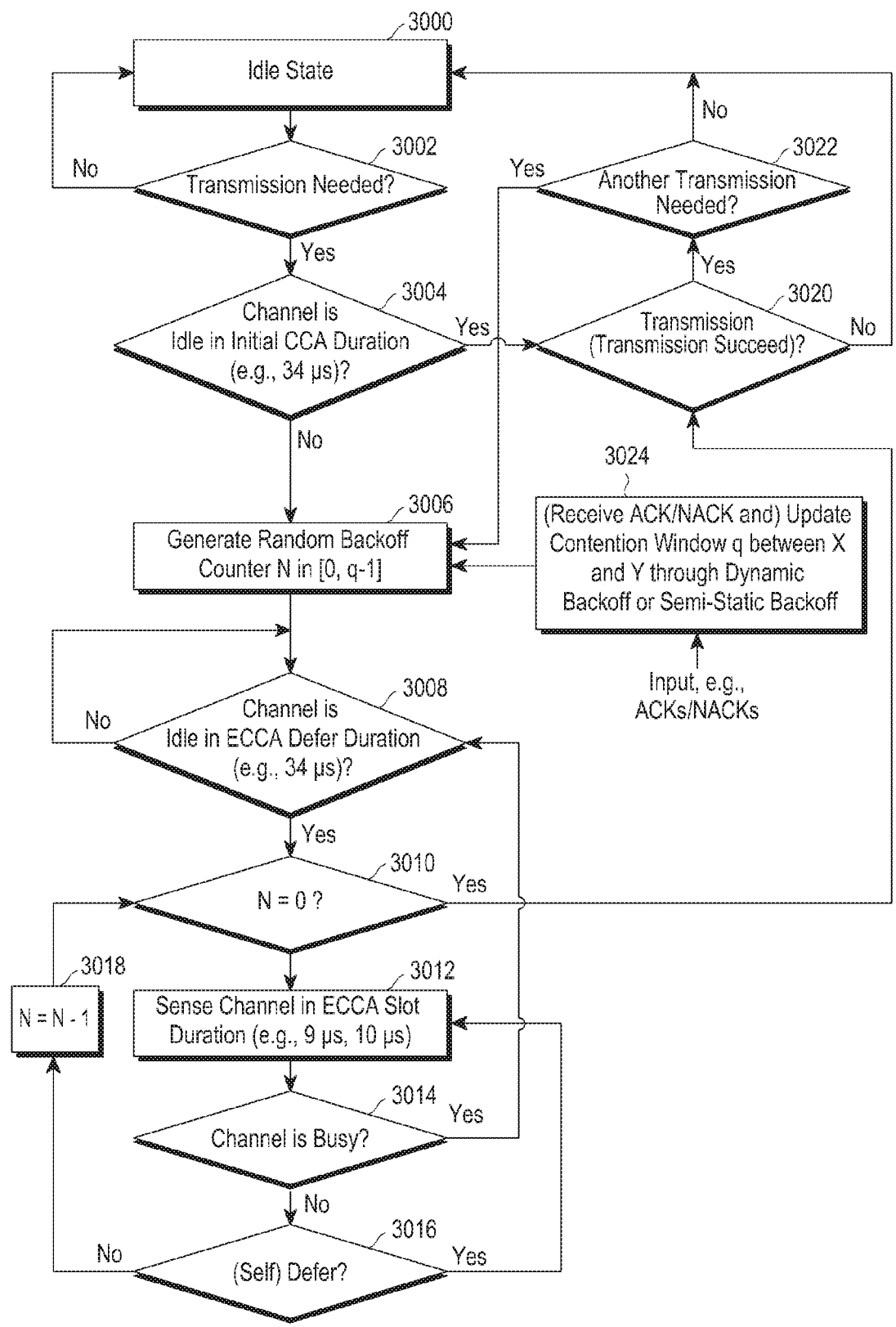
FIG. 30 is another flowchart of an LBT method operating in an unlicensed band.

FIG. 30 is another flowchart of an LBT method operating in an unlicensed band.

When compared to FIG. 29, in FIG. 30, operation 3016 of self-deferring backoff counting by a transmitter is added.

Referring to FIG. 30, if detecting a clear channel in a process of executing ECCA (including operations 3000, 3002, 3004, 3006, 3008, 3010, 3012, and 3014), a transmitter (i.e., an LAA eNB) determines whether to decrement a backoff counter in operation 3016 instead of performing backoff counting, and then performs backoff counting. That is, when detecting a clear channel during execution of ECCA, the transmitter determines whether to perform a self-defer operation. If the eNB determines to perform the defer operation, the eNB resumes CCA in a next CCA slot without decrementing the backoff counter. If the eNB determines not to defer transmission, the eNB decrements the backoff counter by 1 and continues ECCA.

Herein, the transmitter may perform the self-defer operation in the following cases:

Multiple eNBs may perform a defer operation to align transmission start timings of the eNBs after selecting random numbers for ECCA, respectively; and One eNB may perform a defer operation to align transmission start timings of unlicensed carriers after selecting a random number for ECCA for each unlicensed carrier to perform transmission in multiple unlicensed bands.

To achieve the same object as described above, a defer scheme may be performed in a different way.

Figure 31:
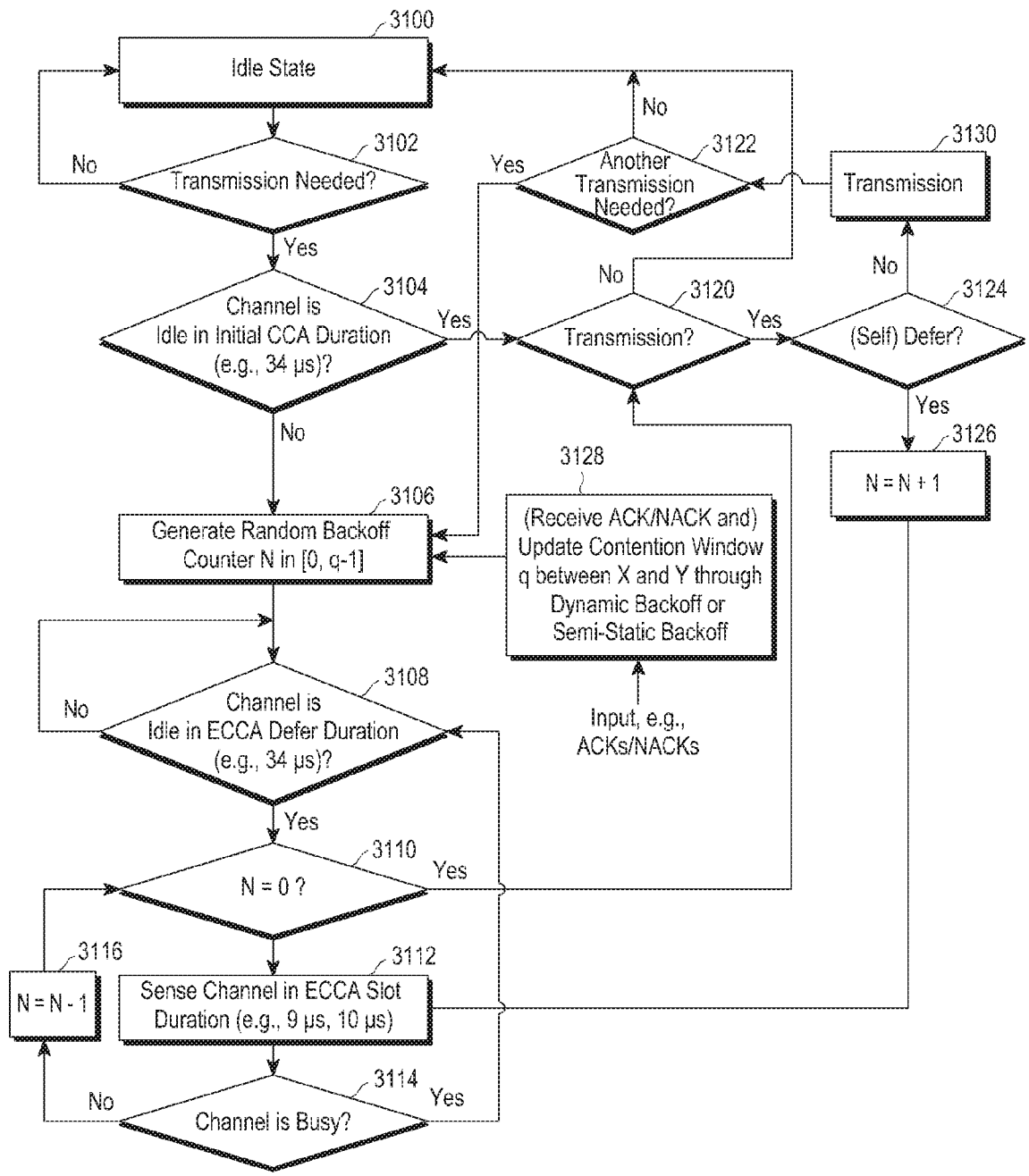
FIG. 31 is another flowchart of an LBT method operating in an unlicensed band.

FIG. 31 is another flowchart of an LBT method operating in an unlicensed band.

When compared to FIG. 29, in FIG. 31, operation 3124 of self-deferring transmission by a transmitter is added. When compared to FIG. 30, in FIG. 31, a position of the defer operation of the transmitter is different.

Referring to FIG. 31, if detecting a clear channel in a process of executing ECCA (including operations 3100, 3102, 3104, 3106, 3108, 3110, 3112, and 3114), a transmitter (i.e., an LAA eNB) performs backoff counting until a backoff counter N becomes 0, and upon N=0, the transmitter determines whether to perform transmission in operation 3124. If the transmitter determines to defer transmission, the transmitter increments the backoff counter by 1 (i.e., N=N+1) and resumes CCA in a next CCA slot.

Herein, 'self-defer' may be expressed as defer, implicit defer, indirect defer, freeze, self-freeze, implicit freeze, indirect freeze, pause, self-pause, implicit pause, indirect pause, etc.

An eNB in an unlicensed band may perform an LBT operation as shown in Table 2. In Table 2, after a counter N becomes 0, the eNB may transmit data. As a result of channel sensing, the counter N may be adjusted as shown in Table 2.

TABLE 2

1) N is set to N = Ninit, in which Ninit is a random number normally distributed between 0 and a contention window CWp.
2) If N > 0 and the eNB determines to decrement the counter, N = N − 1.
3) A channel is sensed in an additional slot duration, and if the channel is idle during the additional slot duration, go to step 4); otherwise, go to step 5).
4) In case of N = 0, the operation is terminated; otherwise, go to step 2).
5) In an additional defer duration $T_d$, the channel is sensed.
6) If the channel is sensed as idle during $T_d$, go to step 2); otherwise, go to step 5).

Table 2 shows an LBT operation of an LAA eNB according to the present disclosure. A procedure of Table 2 is the same as the flowchart shown in FIG. 30. In particular, in step 2) of Table 2, if N (backoff counter) is greater than 0 (N>0) and the eNB chooses to decrement the backoff counter, the eNB decrements N (N=N−1). That is, according to the method proposed in the present disclosure, the eNB determines whether to perform a defer operation even if detecting a clear channel, and once determining to perform the defer operation, the eNB may not decrement N. Needless to say, if determining not to perform the defer operation, the eNB may decrement N.

Figure 32A:
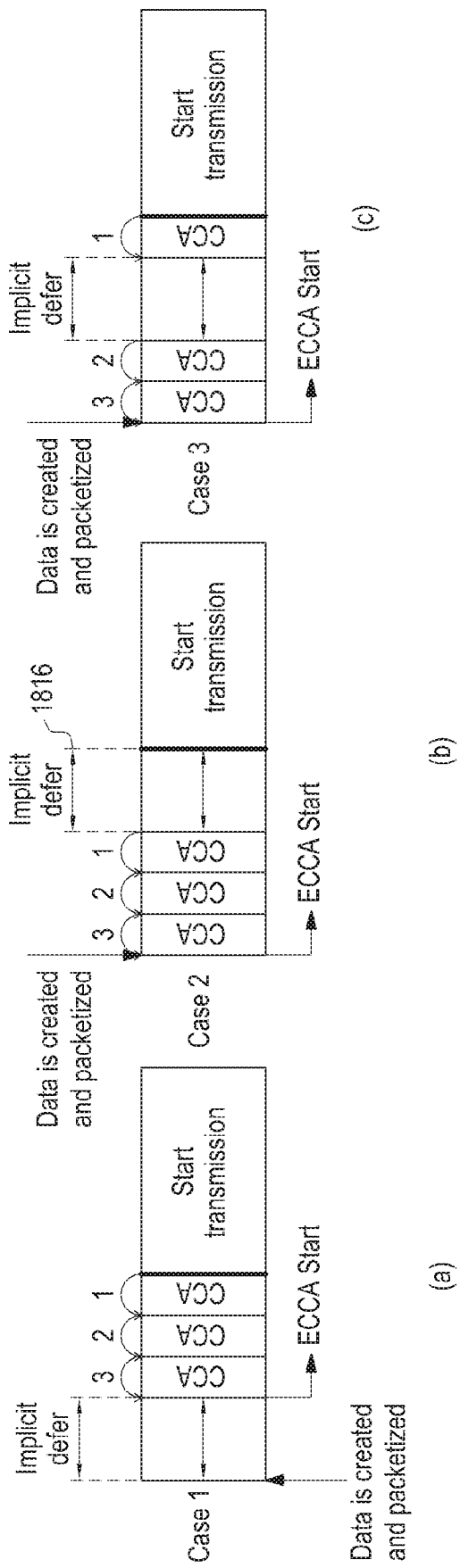
FIGS. 32A and 32B are diagrams showing an LBT method to which a defer operation according to the present disclosure is applied.
Figure 32B:
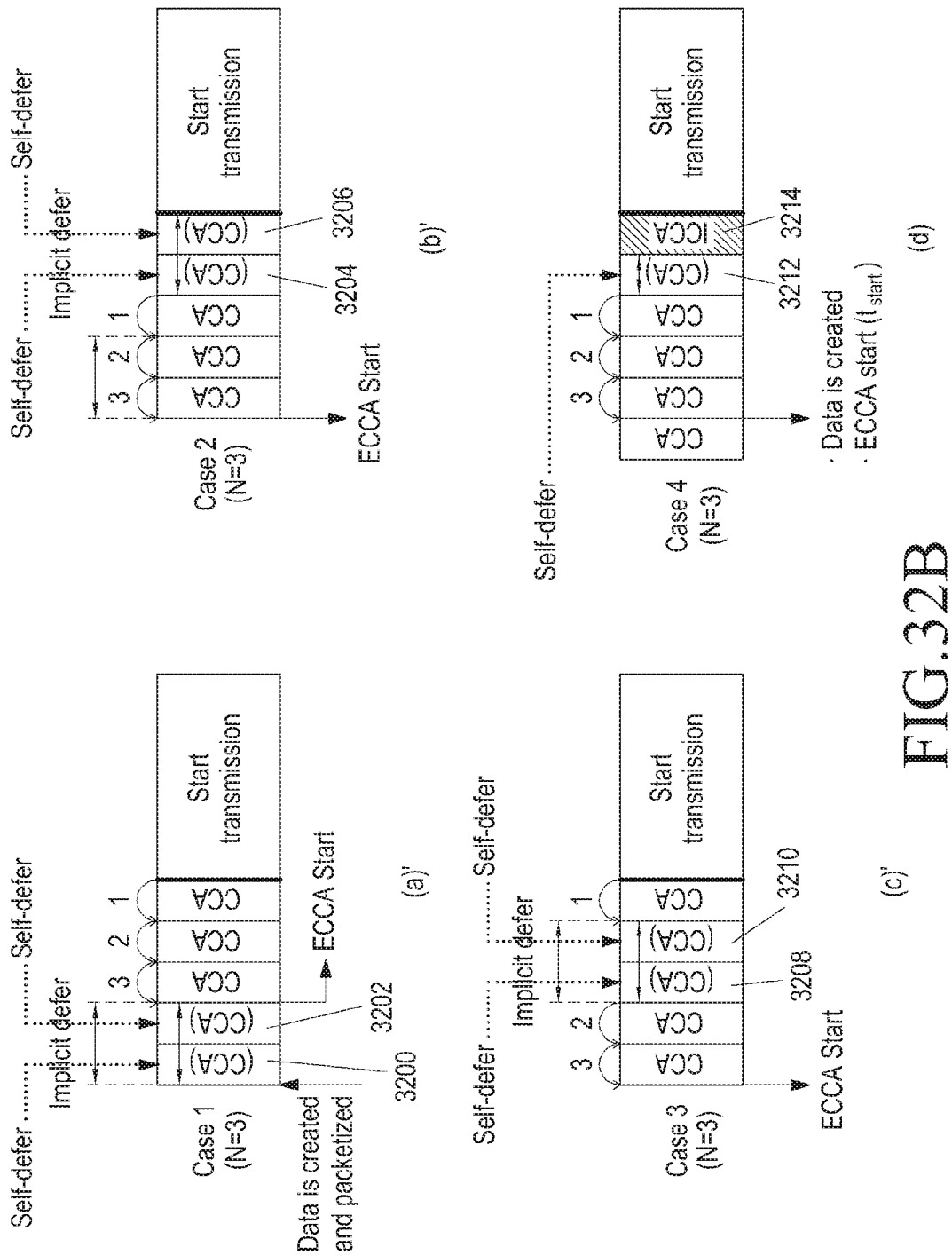

FIGS. 32A and 32B are diagrams showing an LBT method to which a defer operation according to the present disclosure is applied.

FIGS. 32A and 32B show application of the self-defer operation described in FIG. 30 to the method shown in FIGS. 18A-18D. Referring to FIG. 32B, if the transmitter detects a busy channel during an implicit defer duration, the eNB may not be able to decrement a backoff counter. Even if the transmitter detects a clear channel during implicit defer durations 3200, 3202, 3204, 3206, 3208, 3210, and 3212, the eNB does not decrement the backoff counter upon determining to perform a self-defer operation.

In (d) of FIG. 32B, the transmitter selects a random number N=3 for ECCA. Then, upon generation of data, the transmitter starts ECCA and performs a self-defer operation after detecting a total of N=3 clear slots. The transmitter then executes initial CCA 3214 during a predetermined time immediately prior to a subframe boundary or a predefined timing, and upon detecting a clear channel as a result of initial CCA 3214, performs transmission. This may be regarded as an operation of observing a total of N=3 CCA slots until performing transmission and then further executing one initial CCA by the transmitter.

Figure 33A:
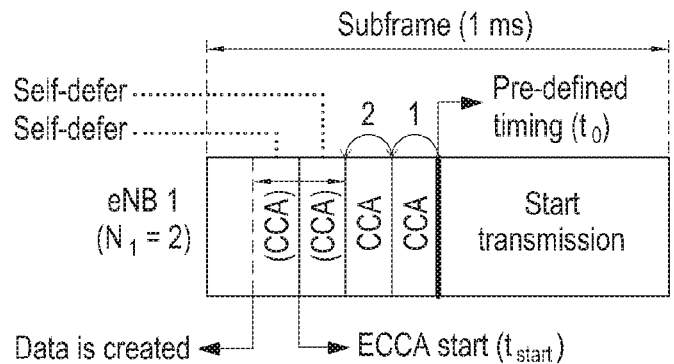
FIGS. 33A, 33B, and 33C are three diagrams showing a self-defer operation by using a defer duration Tdefer.
Figure 33A:
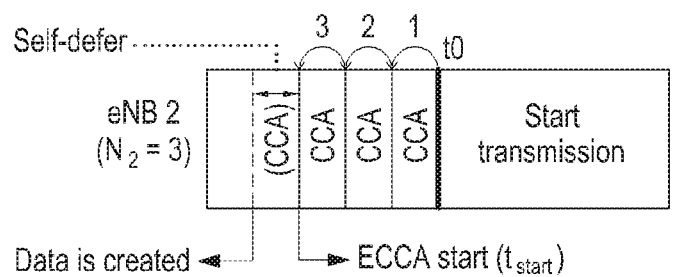
Figure 33A:
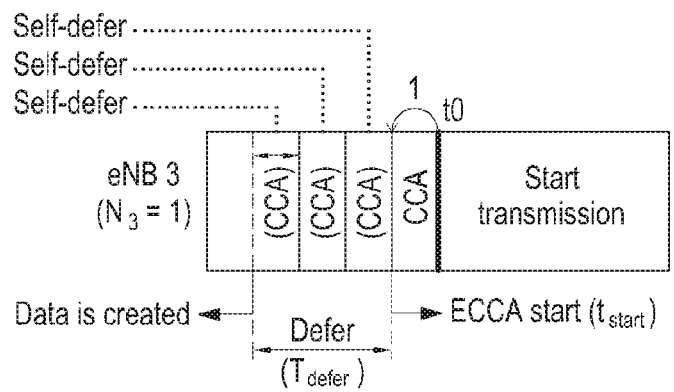
Figure 33B:
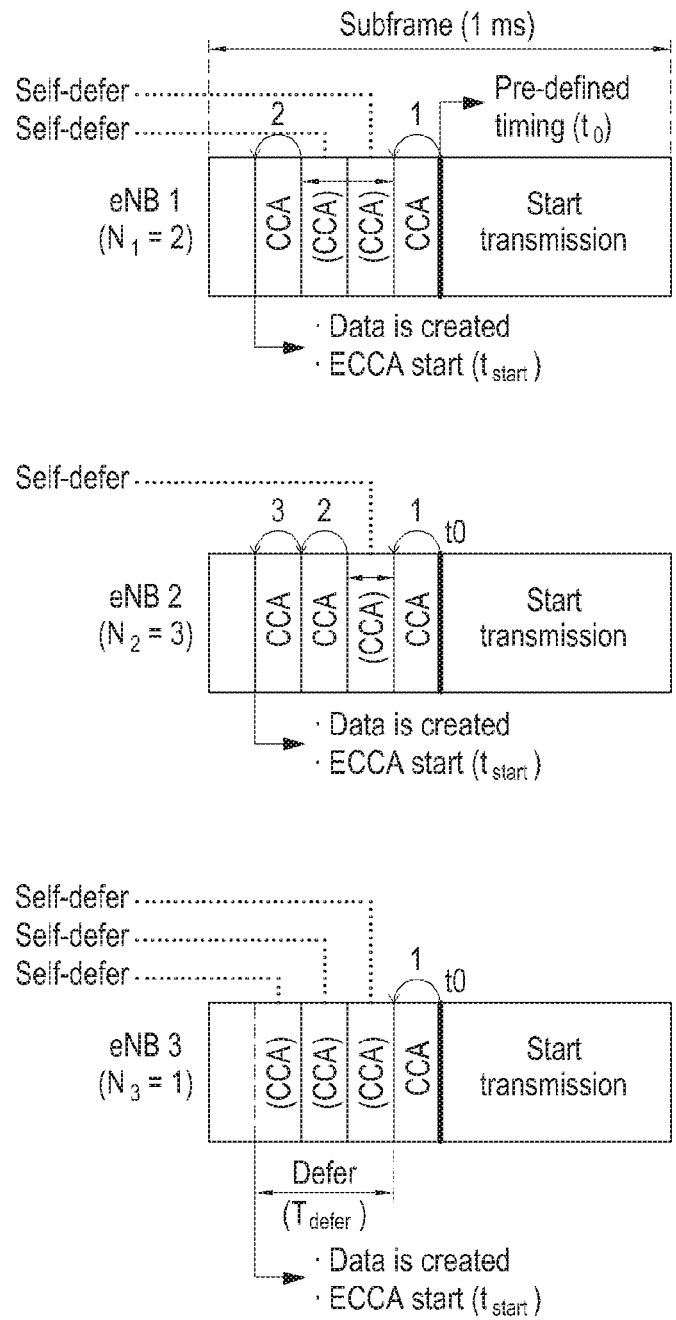
Figure 33C:
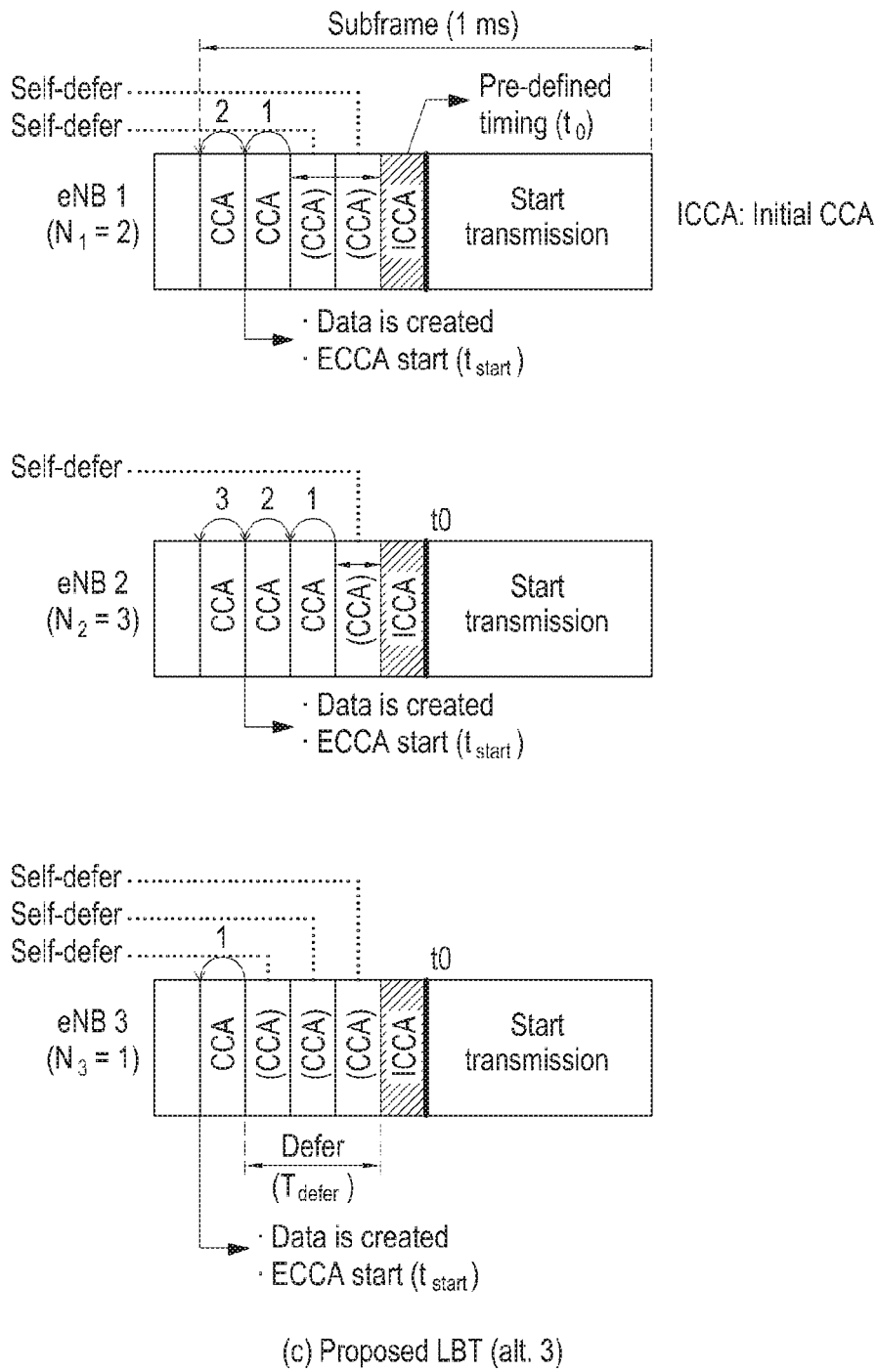

FIGS. 33A, 33B, and 33C are three diagrams showing a self-defer operation by using a defer duration Tdefer.

FIGS. 33A, 33B, and 33C show an example where multiple eNBs achieve frequency reuse according to operations shown in FIG. 32. More specifically, the eNB chooses not to decrement the backoff counter by performing a self-defer operation during Td (Tdefer), and executes CCA in the next CCA slot. Thus, eNBs 1 through 3 may simultaneously start transmission.

Figure 34:
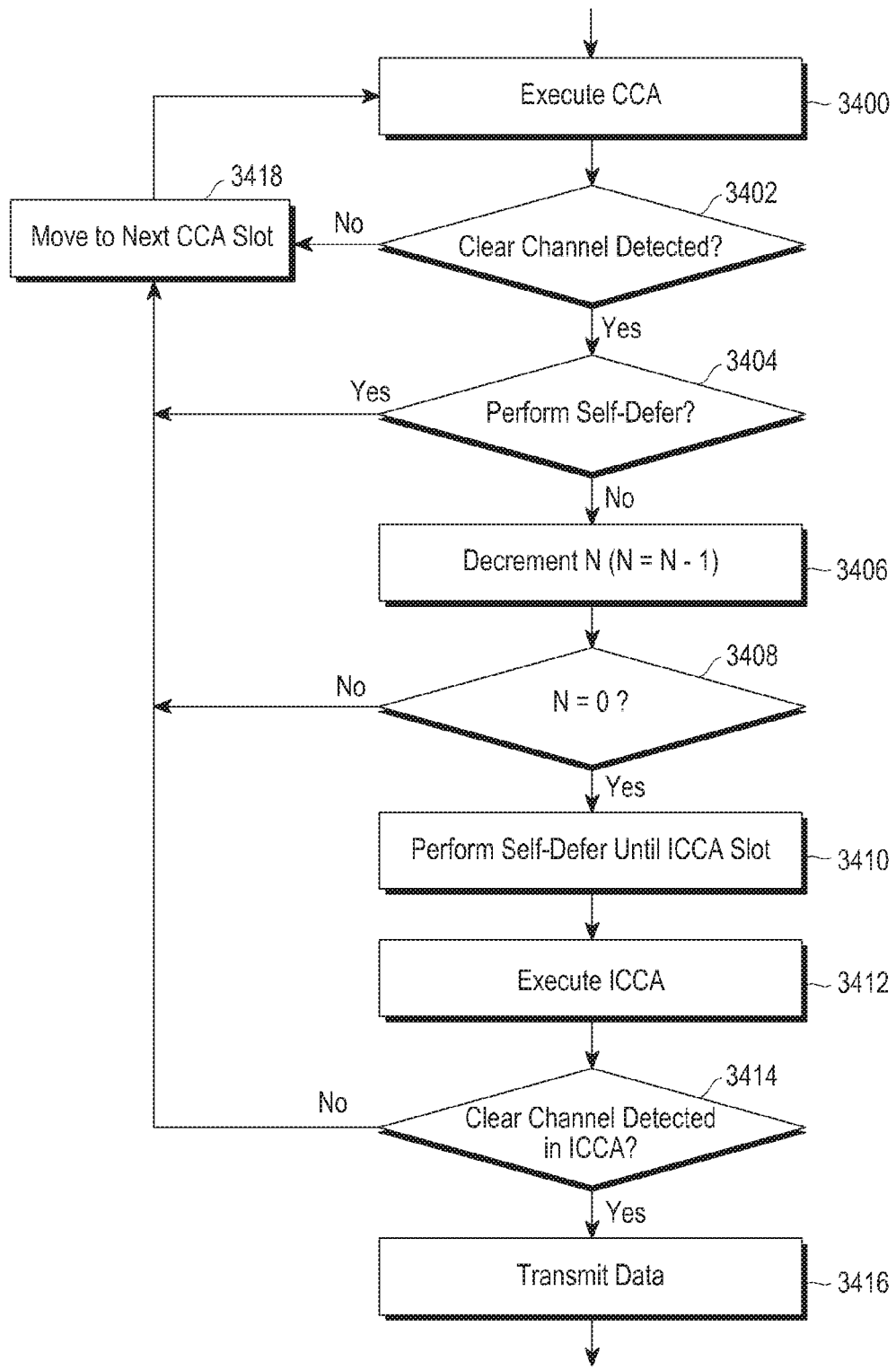
FIG. 34 is a flowchart for describing in more detail an ECCA operation according to the present disclosure by applying a defer operation of a transmitter thereto.

FIG. 34 is a flowchart for describing in more detail an ECCA operation according to the present disclosure by applying a defer operation of a transmitter thereto.

FIG. 34 is a flowchart describing in more detail operation 308 shown in FIG. 3.

In particular, the transmitter performs operation 3404 of determining whether (i.e., to decrement the backoff counter) to perform the self-defer operation when a result of a channel sensing operation 3402 is a clear channel. In this way, the transmitter starts data transmission at a desired point of time (e.g., a shared ECCA end timing) and achieves a frequency reuse rate of 1.

While the present disclosure has been described focusing on a DL, as mentioned previously, the present disclosure may also be applied to UL transmission based on the same principle.

In a DL, the present disclosure may be applied for frequency reuse among multiple carriers (or cells) managed by multiple eNBs or one eNB. FIG. 33 corresponds to such application. In an UL, the present disclosure may be applied for frequency reuse among multiple UEs served in the same cell. If frequency reuse among multiple UEs is not possible, an LAA scheduler (e.g., an LAA eNB) allocates a resource only to one UE at a particular timing.

Suppose UE 1 and UE 2 are allocated with the same resource. Also, suppose UE 1 selects a random number of 4 for ECCA and UE 2 selects a random number of 6 for ECCA. A UE transmits a reservation signal after executing ECCA and performs UL transmission in a subframe boundary. Herein, UE 1, because of selecting a smaller number than UE 2, transmits the reservation signal before UE 2. However, UE 2 receives, as interference, the reservation signal transmitted by UE 1, and thus detects a busy channel during the remaining CCA slot, failing in successfully executing ECCA. As a result, even if UE 1 and UE 2 are scheduled in the same subframe, only UE 1 performs transmission, whereas UE 2 fails to perform transmission.

A self-defer function proposed in the present disclosure may also be applied to an UL environment.

Figure 35:
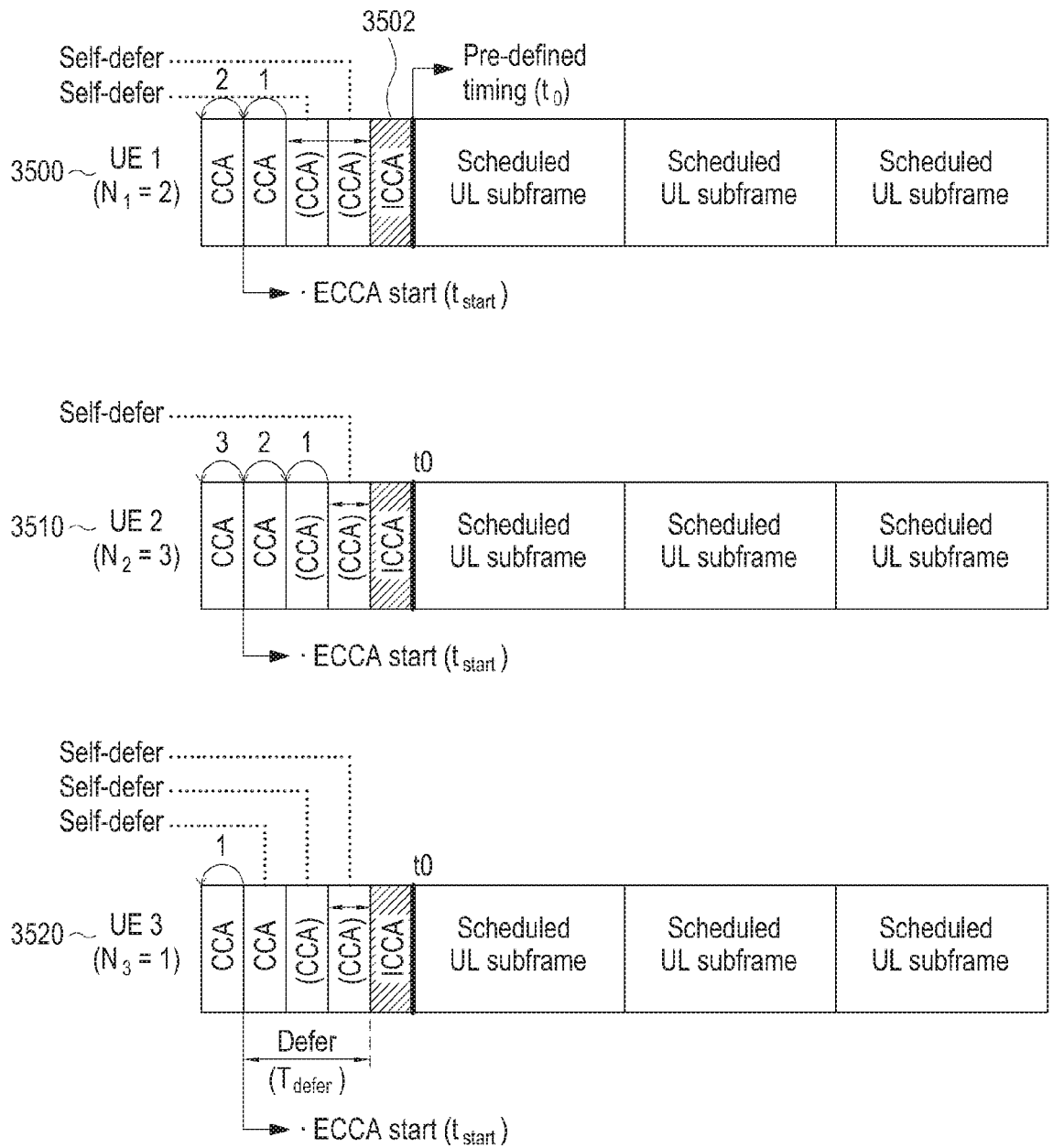
FIG. 35 is an exemplary diagram showing a method in which multiple UEs perform data transmission at the same time in an UL environment according to the present disclosure.

FIG. 35 is an exemplary diagram showing a method in which multiple UEs perform data transmission at the same time in an UL environment according to the present disclosure.

In FIG. 35, UE 1 3500 selects a random number of 2 for ECCA, UE 2 3510 selects a random number of 3 for ECCA, and UE 3 3520 selects a random number of 1 for ECCA. Each of UE 1 3500, UE 2 3510, and UE 3 3520 executes ECCA, and after ending ECCA (that is, after UE 1 detects two clear slots, UE 2 detects three clear slots, and UE 3 detects one clear slot), performs a self-defer operation without immediately performing transmission. Then, each UE may execute ICCA 3502 once at the same time to fit to a subframe boundary, and perform transmission in the subframe boundary. Each UE then independently selects a random number and executes ECCA based on the selected random number. In addition, each UE performs a self-defer operation, instead of transmitting the reservation signal, before the subframe boundary, thereby avoiding interfering with each other. Thus, all of the three UEs may successfully execute ECCA, and even when multiple UEs are scheduled in one UL subframe, they operate without any problems.

In an UL operation, the following procedure may be further considered.

A UE determines a UL subframe scheduled in response to a UL grant of an eNB.

The UE recognizes a CCA duration in which LBT is executed, based on the scheduled UL subframe. Timing offset information may be indicated in the UL grant or an RRC message or may be set in advance. A timing offset may include a timing at which an LBT operation ends, and may further indicate a timing at which the LBT operation starts. The timing offset may be expressed based on an UL subframe boundary ($T_{UL}=-T_{ta}$) or a DL subframe boundary ($T_{DL}=0$).

1) If a CCA duration is located at the initial part of a scheduled UL subframe:

the CCA duration starts at the subframe boundary, and a timing at which the CCA duration ends, that is, at which the UE transmits a signal may be expressed as a timing offset $T_o=N*T_{cca}$. Thus, the CCA duration may be expressed as $[T_{UL}, T_{UL}+T_o]$ or $[T_{DL}, T_{DL}+T_o]$.

2) If a CCA duration is located at the last part of a subframe previous to a scheduled UL subframe:

the CCA duration starts at the subframe boundary, and a timing at which the CCA duration ends, that is, at which the UE transmits a signal may be expressed as a timing offset $T_o=N*T_{cca}$. Thus, the CCA duration may be expressed as $[T_{UL}, T_{UL}+T_o]$ or $[T_{DL}, T_{DL}+T_o]$.

Depending on whether the end subframe of the DL burst is full or partial, the self-defer operation may be applied differently.

1) For a DL full end subframe or a CCA duration in the middle of a UL burst:

FBE-based LBT, that is, an LBT operation of generating a small backoff counter value in a single short CCA duration or backoff window and executing ECCA is performed. An LBT operation may complete start and end when a DL full subframe switches to an UL subframe or in a short CCA duration provided between UL subframes. An eNB makes determination according to such a situation and instructs a UE to perform FBE-based LBT, or the UE receives a signal regarding a subframe structure of the eNB and selects LBT suitable for a situation.

2) For a DL partial end subframe or when a UL burst independent of a DL starts:

LBE-based LBT, that is, an LBT operation of generating a large backoff counter value in a backoff window and executing ECCA is performed. When a DL partial subframe switches to an UL subframe, when an eNB allocates only an UL subframe in a PCell for an SCell, or when a new UL burst far from a previous UL burst starts, the LBT operation may start at a moment when a channel is empty, and then ends immediately before an UL subframe to which the eNB is allocated. The eNB instructs the UE to perform LBE-based LBT according to such a situation, or the UE receives a signal regarding a subframe structure of the eNB and selects LBT suitable for the situation.

Meanwhile, the eNB may instruct the UE as follows in detail.

If a transmission timing indicated by the eNB coincides with a CCA end timing (a PUSCH or SRS transmission timing), the UE performs a self-defer operation, and if the transmission timing precedes the CCA end timing, the eNB transmits a reservation signal and is maintained until the CCA end timing.

If transmission of the reservation signal is needed, a transmission start timing may be a) an UL PUSCH start timing, b) an UpPTS start timing a UE may know through special subframe information, or c) a timing indicated by the eNB. If the eNB indicates the transmission start timing, a timing to transmit a reservation signal after the backoff counter becomes 0 or ends the self-defer operation may be indicated by the eNB through 1) a common downlink control information (DCI) or system information block (SIB) message or 2) a dedicated DCI, MAC CE, RRC message.

The eNB may separately indicate resource element (RE) mapping information of the reservation signal to the UE. According to an embodiment of the present disclosure, the eNB may use a common RE mapping pattern on a basis of a UE/eNB group or a PLMN. Another UE/eNB group or a UE/eNB of another PLMN may fail in LBT due to the reservation signal, but an identical UE/eNB group or a UE/eNB of an identical PLMN may perform LBT only for a non-used RE or may identify a UE/eNB of an identical group/PLMN and adjust an LBT related parameter (a CCA adjustment threshold, a transmission power, etc.).

According to an embodiment of the present disclosure, the eNB may indicate to the UE, a small backoff counter or contention window value that is executable in a short CCA duration for one UL subframe. If the UE performs FBE-based LBT, the UE performs LBT in a short CCA duration by using a backoff counter indicated by the eNB or the backoff counter made from the contention window. The UE performs a self-defer operation if the backoff counter becomes 0 prior to a predefined transmission timing (a subframe boundary, a PUSCH/SRS transmission timing, a reservation signal, etc.), and continues the self-defer operation until the predefined transmission timing. If the UE fails to cause the backoff counter to become 0 due to a failure in LBT up to the predefined transmission timing, in a CCA duration for a next allocated UL subframe, the UE 1) newly performs LBT by using a backoff counter or a contention window indicated for that subframe or 2) resumes LBT by maintaining a backoff counter used in a previous LBT operation. Meanwhile, if the UE performs LBE-based LBT, the UE performs LBT by using a backoff counter already indicated by the eNB or a backoff counter made from a contention window, and maintains a previously used backoff counter even if being indicated for the current UL subframe. However, the UE regards the backoff counter for the current UL subframe as a timing to end LBT and to start UL transmission. Thus, the UE performs a self-defer operation of deferring transmission until the transmission start timing even if the remaining backoff counter becomes 0.

A description will now be made of how to implement the proposed scheme of the present disclosure. Basically, the proposed scheme may be performed based on operations described in the 3GPP 36.213 standardization document.

After an idle state is detected during a defer duration Td from channel measurement, and after the counter N becomes 0, the eNB may perform transmission including a PDSCH in a channel in which LAA SCell transmission is performed. The counter N may be adjusted according to channel sensing.

A subsequent operation may be performed according to an embodiment shown in the following tables.

Table 3 corresponds to a first embodiment.

TABLE 3

0) An eNB sets CCA/ECCA end timings proposed in the present disclosure to a timing set by the eNB described below.
1) N is set to N = Ninit, in which Ninit is a random number normally distributed between 0 and a contention window CWp.
2) If N > 0 and the eNB determines to decrement the counter, N = N − 1.
: if(N is greater than 0.)
: if(N is equal to 1.)
  if(an end timing of a next sensing slot duration is a timing set by the eNB.)
the eNB chooses to decrement a counter.
set N = N − 1. (decrement N by 1)
  else(the end timing of the next sensing slot duration is not the timing set by the eNB.)
the eNB chooses not to decrement the counter.
do not change N. (maintain N)
end
else(N is not equal to 1.)
  the eNB chooses to decrement the counter.
set N = N − 1. (decrement N by 1)
end
end
3) A channel is sensed in an additional slot duration, and if the channel is idle during the additional slot duration, go to step 4); otherwise, go to step 5).
4) In case of N = 0, the operation is terminated; otherwise, go to step 2).
5) In an additional defer duration $T_d$, the channel is sensed.
6) If the channel is sensed as idle during $T_d$, go to step 2); otherwise, go to step 5).

Table 4 corresponds to a second embodiment.

TABLE 4

0) An eNB sets CCA/ECCA end timings proposed in the present disclosure to a timing set by the eNB described below.
1) N is set to N = Ninit, in which Ninit is a random number normally distributed between 0 and a contention window CWp.
2) If N > 0 and the eNB determines to decrement the counter, N = N − 1.
: if(N is greater than 0.)
if(N is $N_{init}$.)
  if(an ending timing of $N_{init}$ consecutive sensing slot durations is a timing set by the eNB.)
the eNB chooses to decrement the counter.
set N = N − 1. (decrement N by 1.)
  else(the ending timing of the $N_{init}$ consecutive sensing slot durations is not the timing set by the eNB.)
the eNB chooses not to decrement the counter.
do not change N. (maintain N.)

TABLE 4-continued

```
end
else(N is not N_init.)
   the eNB chooses to decrement the counter.
   set N = N − 1. (decrement N by 1.)
   end
end
3) A channel is sensed in an additional slot duration, and if the channel is idle during the
additional slot duration, go to step 4); otherwise, go to step 5).
4) In case of N = 0, the operation is terminated; otherwise, go to step 2).
5) In an additional defer duration T_d, the channel is sensed.
6) If the channel is sensed as idle during T_d, go to step 2); otherwise, go to step 5).
```

Table 5 corresponds to a third embodiment.

TABLE 5

```
0) An eNB sets CCA/ECCA end timings proposed in the present disclosure to a timing set by the
eNB described below.
1) N is set to N = Ninit, in which Ninit is a random number normally distributed between 0 and a
contention window CWp.
2) If N > 0 and the eNB determines to decrement the counter, N = N − 1.
: while(N is not 0.)
sense the channel during the slot durations of an additional defer duration T_d.
if(sensing result is idle.)
if(in step 5, the ending timing of the sensing slot is the timing set by the eNB.)
      The eNB performs transmission through an LAA SCell.
      End while phrase.
else(in step 5, the ending timing of the sensing slot is not the timing set by the eNB.)
      do nothing.(do nothing.)
end
else(sensing result is busy.)
   do nothing.(do nothing.)
end
end
3) A channel is sensed in an additional slot duration, and if the channel is idle during the
additional slot duration, go to step 4); otherwise, go to step 5).
4) In case of N = 0, the operation is terminated; otherwise, go to step 2).
5) In an additional defer duration T_d, the channel is sensed.
6) If the channel is sensed as idle during T_d, go to step 2); otherwise, go to step 5).
```

If the eNB does not perform transmission including a PDSCH in a channel in which LAA SCell transmission is performed, the eNB may perform transmission including the PDSCH after sensing that the channel is idle at least in a slot duration of the additional defer duration Td.

A first embodiment of Table 3 corresponds to an operation of determining whether to perform a self-defer operation by the eNB for N=1. A second embodiment of Table 4 corresponds to an operation of determining whether to perform a self-defer operation by the eNB for N=Ninit. A third embodiment of Table 5 corresponds to an operation of determining whether to perform a self-defer operation by the eNB for N=0.

In addition, the present disclosure includes an operation of determining whether to perform a self-defer operation by the eNB for N=random number. If the present disclosure is applied to an UL, the eNB mentioned in the above description of the operations of the proposed scheme may be changed into the UE for application of the present disclosure to the UL.

Figure 36:
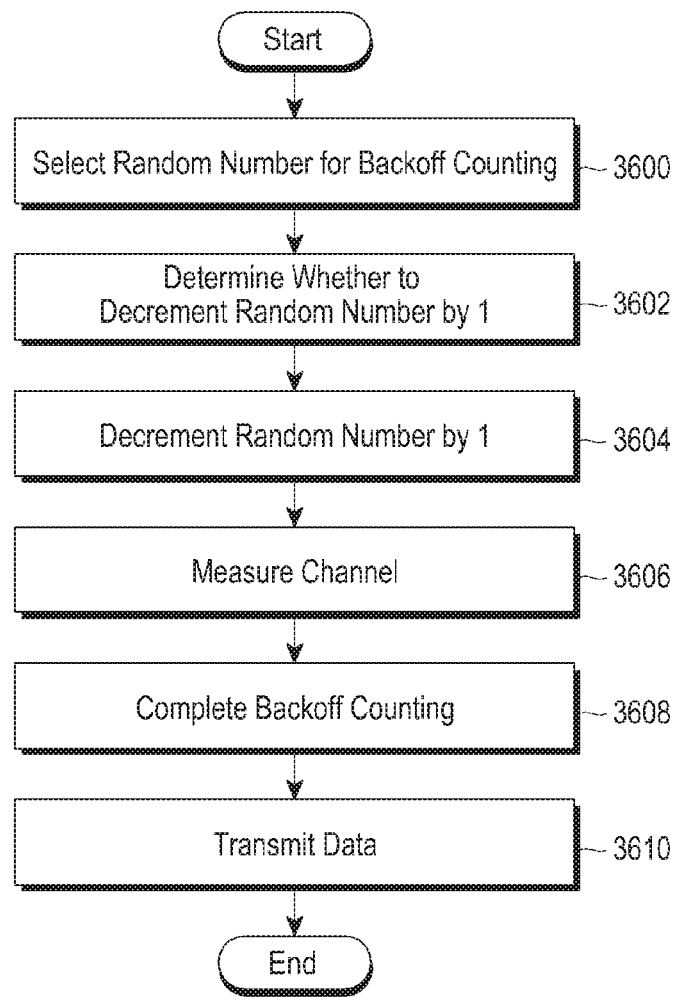
FIG. 36 is a flowchart of a data transmission method by a transmission device according to the present disclosure.

FIG. 36 is a flowchart of a data transmission method by a transmission device according to the present disclosure.

A transmitter for transmitting data through a channel of an unlicensed band executes CCA. To this end, the transmitter selects a random number for backoff counting in operation 3600.

The transmitter determines whether to decrement the random number in operation 3602.

The transmitter decrements the random number by 1 according to the determination in operation 3604.

The transmitter measures the channel in operation 3606.

When the random number becomes 0, the transmitter determines whether to end backoff counting based on the measurement result of the channel in operation 3608.

Once ending backoff counting, the transmitter transmits the data through the channel in operation 3610.

Figure 37:
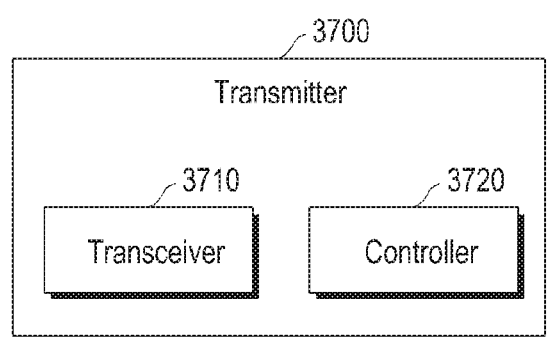
FIG. 37 is a block diagram of a transmitter according to embodiments of the present disclosure.

FIG. 37 is a block diagram of a transmitter according to embodiments of the present disclosure.

A transmitter 3700 may include a transmission/reception unit 3710 for transmission/reception of a signal to and from an entity of another communication device or network and a controller 3720 for controlling all operations of the transmitter 3700. In the present disclosure, all of the operations of the LLA eNB or UE described above may be understood as being performed by a control operation of the controller 3720. However, the controller 3720 and the transceiver 3710 should not be necessarily implemented as separate components, and may be implemented as one component in the form of, for example, a single chip.

It should be noted that diagrams of the method and the device shown in FIGS. 1 through 37 are not intended to limit the scope of the present disclosure. In other words, all of components or operations shown in FIGS. 1 to 37 should not be construed to be essential components for implementation of the present disclosure, and even though only some data units, operations or components are included, the present disclosure may be implemented without departing from the scope and spirit of the disclosure.

The above described operations may be implemented by providing a memory device storing a corresponding program code to an entity of a communication system, a function, a base station, or a specific structural element of the terminal device. That is, the entity, the function, the BS, or the controller of the UE carries out the above described operations by reading and executing the program code stored in the memory device by means of a processor or a central processing unit (CPU).

Various components and modules of the entity, the function, the load manager, or a terminal device described therein may be operated using a hardware circuit (e.g., a complementary metal oxide semiconductor (CMOS)-based logical circuit), firmware, software and/or a hardware circuit such as a combination of hardware, firmware and/or software embedded in a machine-readable medium. For example, various electric configurations and methods may be carried out by using electric circuits such as transistors, logic gates, and on-demand semiconductors.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for transmitting data on a channel by a base station in a licensed assisted access (LAA) system, the method comprising:
randomly selecting a number for counting;
setting a variable value as the number for counting;
determining, by the base station, whether to decrement the variable value;
decrementing the variable value by 1 in case that the variable value is greater than 0 and the base station determines to decrement the variable value;
determining that the channel is idle for a first duration by sensing the channel;
determining that the variable value is 0 in case that the channel is idle for the first duration;
in case that the variable value is 0, identifying whether the base station has transmitted data on a physical downlink shared channel (PDSCH) on a carrier in which LAA secondary cell (SCell) transmission is performed;
determining whether the channel is idle for a second duration in case that the base station has not transmitted the data on the PDSCH; and
transmitting the data on the PDSCH in case that the variable value is 0 and the channel is idle for the second duration.

2. The method of claim 1, further comprising sensing the channel in an additional duration if the channel is not idle.

3. The method of claim 1, wherein the counting is completed at a specific timing shared among communication entities in the system.

4. The method of claim 1, further comprising transmitting a reservation signal or an initial signal for the channel in a specific duration, before transmitting the data on the PDSCH.

5. The method of claim 4, wherein the reservation signal or the initial signal comprises information identifying the base station.

6. The method of claim 4, wherein the reservation signal or the initial signal comprises a public land mobile network (PLMN) identifier.

7. The method of claim 1, further comprising stopping transmission through the channel in an additional duration, before transmitting the data on the PDSCH.

8. The method of claim 1, wherein a timing at which the counting is completed does not fall within a distributed coordination function (DCF) interframe space (DIFS).

9. The method of claim 1, wherein the base station manages a plurality of cells or a plurality of carriers, and
wherein the base station determines whether to decrement the number for counting after first sensing the channel to be idle.

10. A base station for transmitting data on a channel in a licensed assisted access (LAA) system, the base station comprising:
a transceiver; and
a processor coupled with the transceiver and configured to control to:
randomly select a number for counting,
set a variable value as the number for counting,
determine whether to decrement the variable value,
decrement the variable value by 1 in case that the variable value is greater than 0 and the base station determines to decrement the variable value,
determine that the channel is idle for a first duration by sensing the channel,
determine that the variable value is 0 in case that the channel is idle for the first duration,
in case that the variable value is 0, identify whether the base station has transmitted data on a physical downlink shared channel (PDSCH) on a carrier in which LAA secondary cell (SCell) transmission is performed,
determine whether the channel is idle for a second duration, and
transmit the data on the PDSCH in case that the variable value is 0 and the channel is idle for the second duration.

11. The base station of claim 10, wherein the processor is further configured to sense the channel in an additional duration if the channel is not idle.

12. The base station of claim 10, wherein the counting is completed at a specific timing shared among communication entities in the system.

13. The base station of claim 10, wherein the processor is further configured to transmit a reservation signal or an initial signal for the channel in a specific duration, before transmitting the data on the PDSCH.

14. The base station of claim 10, wherein the base station manages a plurality of cells or a plurality of carriers, and
wherein the processor is configured to determine whether to decrement the number for counting after first sensing the channel to be idle.

* * * * *